United States Patent
Christmas et al.

(10) Patent No.: US 11,874,631 B2
(45) Date of Patent: Jan. 16, 2024

(54) HOLOGRAPHIC IMAGE ALIGNMENT

(71) Applicant: Envisics Ltd, Milton Keynes (GB)

(72) Inventors: Jamieson Christmas, Milton Keynes (GB); Michal Wengierow, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 371 days.

(21) Appl. No.: 17/119,709

(22) Filed: Dec. 11, 2020

(65) Prior Publication Data
US 2021/0191321 A1  Jun. 24, 2021

(30) Foreign Application Priority Data
Dec. 18, 2019 (GB) ..................... 1918702

(51) Int. Cl.
*G03H 1/30* (2006.01)
*G02B 27/01* (2006.01)
(Continued)

(52) U.S. Cl.
CPC .............. *G03H 1/30* (2013.01); *G02B 27/01* (2013.01); *G02B 27/0103* (2013.01);
(Continued)

(58) Field of Classification Search
CPC .......... G03H 1/30; G03H 1/22; G03H 1/2205; G03H 1/2286; G03H 1/2294; G03H 1/26;
(Continued)

(56) References Cited

U.S. PATENT DOCUMENTS

2012/0008181 A1*  1/2012  Cable .................. G03H 1/2294
                                                                 359/9
2016/0091720 A1  3/2016  Stafford et al.
(Continued)

FOREIGN PATENT DOCUMENTS

CN       108287414 A      7/2018
GB       2559112 A   *   8/2018  ............... G02B 5/32
(Continued)

OTHER PUBLICATIONS

UKIPO Combined Search and Examination Report under Sections 17 and 18(3), Application No. 1918702.0, dated Jun. 15, 2020, 5 pages.
(Continued)

*Primary Examiner* — Stephone B Allen
*Assistant Examiner* — Jyotsna V Dabbi
(74) *Attorney, Agent, or Firm* — McDonnell Boehnen Hulbert & Berghoff LLP

(57) ABSTRACT

A method of holographic projection includes projecting at least one calibration image. The method includes performing the following steps for each calibration image in order to determine a plurality of displacements vectors at a respective plurality of different locations on the replay plane: projecting the calibration image onto the replay plane using a first colour holographic channel by displaying a first hologram on a first spatial light modulator and illuminating the first spatial light modulator with light of the first colour; projecting the calibration image onto the replay using a second colour holographic channel by displaying a second hologram on a second spatial light modulator and illuminating the second spatial light modulator with light of the second colour, the first and second hologram corresponding to the calibration image; determining the displacement vector between the light spot formed by the first colour holo- (Continued)

graphic channel and the light spot formed by the second colour holographic channel; and pre-processing an image for projection using the second colour holographic channel in accordance with the plurality of determined displacement vectors.

20 Claims, 17 Drawing Sheets

(51) Int. Cl.
   *G03H 1/22* (2006.01)
   *G03H 1/26* (2006.01)
   *G06T 7/33* (2017.01)
   *G06T 5/00* (2006.01)
   *G03H 1/08* (2006.01)

(52) U.S. Cl.
   CPC ........... *G02B 27/0172* (2013.01); *G03H 1/22* (2013.01); *G03H 1/2205* (2013.01); *G03H 1/2286* (2013.01); *G03H 1/2294* (2013.01); *G03H 1/26* (2013.01); *G06T 5/006* (2013.01); *G06T 7/33* (2017.01); *G02B 2027/0112* (2013.01); *G03H 2001/0825* (2013.01); *G03H 2001/2218* (2013.01); *G03H 2001/2244* (2013.01); *G03H 2001/2263* (2013.01); *G03H 2001/2297* (2013.01); *G03H 2001/303* (2013.01); *G03H 2222/18* (2013.01); *G03H 2223/55* (2013.01); *G03H 2225/22* (2013.01); *G03H 2225/23* (2013.01); *G03H 2225/61* (2013.01); *G03H 2226/02* (2013.01); *G03H 2250/38* (2013.01); *G06T 2207/10024* (2013.01)

(58) Field of Classification Search
   CPC ... G03H 2001/0825; G03H 2001/2218; G03H 2001/2244; G03H 2001/2263; G03H 2001/2297; G03H 2001/303; G03H 2222/18; G03H 2223/55; G03H 2225/22; G03H 2225/23; G03H 2225/61; G03H 2226/02; G03H 2250/38; G02B 27/01; G02B 27/0103; G02B 27/0172; G02B 2027/0112; G06T 7/33; G06T 5/006; G06T 2207/10024
   USPC ......................................................... 359/22
   See application file for complete search history.

(56) References Cited

U.S. PATENT DOCUMENTS

2016/0320752 A1* 11/2016 Seo .................. G03H 1/0841
2018/0120768 A1* 5/2018 Christmas ................ G03H 1/02

FOREIGN PATENT DOCUMENTS

| JP | 2018-501498 A | 1/2018 |
| KR | 2019-0076056 A | 7/2019 |
| WO | 2018100397 A1 | 6/2018 |

OTHER PUBLICATIONS

Song-Jie Li, et al., "Color Holographic Magnification System Using Spatial Light Modulators," School of Electronics and Information Engineering, Sichuan University, Chengdu 610065, China, SID 2016 Digest, pp. 1430-1432.

Li, Song-Jie et al., "Color holographic magnification system based on spatial light modulators," Journal of the Society for Information Display, vol. 24, Issue 2, 2016.

* cited by examiner

HOLOGRAPHIC IMAGE ALIGNMENT

CROSS-REFERENCE TO RELATED APPLICATIONS

This application claims the benefit of priority of United Kingdom Patent Application no. 1918702.0, filed Dec. 18, 2019, which is hereby incorporated herein by reference in its entirety.

FIELD

The present disclosure relates to a holographic projector. More specifically, the present disclosure relates to a colour holographic projector and a method of holographically projecting a plurality of single colour images. Some embodiments relate to a method of pre-processing, such as distorting, an image before hologram calculation. Some embodiments relate to a method of aligning a plurality of single colour images each formed by holographic projection using an independent single colour holographic channel. Some embodiments relate to a head-up display and a method of aligning a plurality of single colour virtual images formed by a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A colour holographic projector may be formed by combining a plurality of single colour holographic projection channels. Each projection channel may comprise a spatial light modulator arranged to display holograms and a monochromatic light source. Light of different respective colours, which may be emitted by different respective monochromatic light sources, will have different respective wavelengths. Each hologram may be illuminated by light from the corresponding light source. The light is spatially-modulated in accordance with the hologram. The spatially-modulated light may form an image on a replay plane. The replay plane is spatially separated from the spatial light modulator and the process is referred to as holographic projection. The image is a holographic reconstruction of a desired light pattern. For example, the hologram may be a Fourier hologram or Fresnel hologram. Notably, each single colour image is formed by an independent light channel. However, this presents complex alignment issues caused by numerous factors such as wavelength-dependent distortion, non-linear colour separation, wavelength-dependent rotation and image key-stoning—particularly if the holographic projector is the picture generating unit of a head-up display comprising at least one high magnification freeform mirror. Each single colour image formed by holographic projection may comprise a plurality of image dots or pixels. Misalignment between image pixels of one colour with the corresponding image pixels of another colour can significantly degrade the perceived image quality. The present disclosure describes methods which address the alignment problem.

SUMMARY

Aspects of the present disclosure are defined in the appended independent claims.

In a first aspect of the present disclosure, there is a method of aligning a first (e.g. green) holographic reconstruction and a second (e.g. red or blue) holographic reconstruction. A first step of the method comprises forming a first holographic reconstruction of a plurality of discrete light features (e.g. light spots) on a display plane using a first holographic projection channel, wherein the first holographic projection channel comprises a first spatial light modulator (e.g. phase modulator such as liquid crystal on silicon spatial light modulator) arranged to display holograms (e.g. Fourier or Fresnel holograms). The first spatial light modulator may be arranged for illumination by light of a first wavelength (e.g. green light). A second step of the method comprises forming a second holographic reconstruction of the plurality of discrete light features on the display plane using a second holographic projection channel, wherein the second holographic projection channel comprises a second spatial light modulator arranged to display the holograms combined (e.g. superposed) with at least one grating function. The first spatial light modulator may be arranged for illumination by light of a second, different wavelength (e.g. red or blue light). Each grating function has a respective displacement direction. Each grating function is a linear or 1D grating function. The person skilled in the art will be familiar with the idea of a linear grating providing a displacement of light in one direction. The display plane is spatially-separated from the first and second spatial light modulators. The first and second holographic reconstruction is projected onto the display plane. A third step of the method comprises capturing images of the display plane. A fourth step of the method comprises, for each discrete light feature, individually determining a grating angle of each grating function required to align, in the respective displacement direction, the first holographic reconstruction of the discrete light feature with the second holographic reconstruction of the corresponding discrete light feature. This is in order to obtain, for each displacement direction, a plurality of grating angles at a respective plurality of different locations on the display plane. The method may comprise a fifth step of calculating a distance (i.e. the magnitude of a linear displacement on the display plane) from each determined grating angle to form a displacement value in each displacement direction at each location of the plurality of different locations on the display plane. The method may comprise a sixth step of interpolation to form a displacement map for the entire/total replay field area of the second holographic projection channel in each displacement direction. The method may be used to change/process (e.g. distort) a target image before calculation of the hologram used to form the holographic reconstruction of the target image.

The plurality of discrete light features of each holographic projection channel may be formed using only one hologram or a plurality of different holograms displayed in succession.

The method may further comprises forming a virtual image of the first holographic reconstruction and second holographic reconstruction on the display plane using an optical combiner, optionally, wherein the optical combiner is a windscreen of a vehicle.

According to another aspect, there is provided a display system comprising a first holographic projection channel comprising a first spatial light modulator arranged to display holograms and a light source arranged for illumination of the first spatial light modulator by light of a first wavelength and a second holographic projection channel comprising a second spatial light modulator arranged to display holograms combined with at least one grating function, wherein each grating function has a respective displacement direction, and a light source arranged for illumination of the second spatial light modulator by light of a second wavelength. The display system further comprises an image capture device and a processor.

The display system is configured to align a first holographic reconstruction and a second holographic reconstruction by forming a first holographic reconstruction of a plurality of discrete light features on a display plane using the first holographic projection channel, forming a second holographic reconstruction of the plurality of discrete light features on the display plane using the second holographic projection channel, capturing images of the display plane, and, for each discrete light feature, determining a grating angle of each grating function required to align, in the respective displacement direction, the first holographic reconstruction of the discrete light feature with the second holographic reconstruction of the corresponding discrete light feature in order to obtain, for each displacement direction, a plurality of grating angles at a respective plurality of different locations on the display plane.

Each discrete light feature may comprise a single image pixel, wherein a single image pixel is is typically the smallest feature, within a holographic reconstruction, that can be holographically reconstructed by the holographic projection channel and individually formed in the replay field. Each discrete light feature may comprise more than one such image pixel. Each discrete light feature may comprise an area, or region, within a holographic reconstruction. Each such area, or region, may have a predetermined shape and size. For example, each discrete light feature may comprise a circle, oval or ellipse, each of which may encompass (or be comparable in size to) one, or more than one, image pixels. When each discrete light feature comprises an image region that is larger in size than an individual image pixel, one or more of such image regions may intersect more than one image pixel, within a holographic reconstruction. When each discrete light feature comprises an image region that is larger in size than an individual image pixel, an image region may comprise a part or a whole of one or more image pixels.

In an example, the method of the first aspect comprises:
(a) displaying a first diffractive pattern on a first spatial light modulator and illuminating the first diffractive pattern with light of a first colour to form a first colour holographic projection of a calibration image, wherein the first diffractive pattern comprises a hologram of the calibration image and the calibration image comprises at least one light feature;
(b) displaying a second diffractive pattern on a second spatial light modulator and illuminating the second diffractive pattern with light of a second colour to form a second colour holographic projection of the calibration image, wherein the second diffractive pattern comprises the hologram of the calibration image and a second grating function having a displacement direction;
(c) determining a grating angle (or a plurality of grating angles) of the second grating function required to align in the displacement direction a first colour holographic reconstruction of the/each light feature of the calibration image with a second colour holographic reconstruction of the/each corresponding light feature; and, optionally,
(d) determining a required displacement corresponding to each grating angle, in the displacement direction. The required displacement may comprise a 'pixel correction', wherein the required displacement is expressed in terms of number of pixels of the second spatial light modulator, in the displacement direction.

The method may further comprise repeating steps (c) and (d) in order to determine a required displacement, in the displacement direction, for a plurality of discrete light features, at a corresponding plurality of points on the holographic replay plane.

The calibration image may comprise a light feature at each of the plurality of points on the holographic replay plane. Alternatively, each of the plurality of points on the holographic replay plane may correspond to an image region, each of which may encompass one or more light features and/or respective parts of one or more light features. Alternatively, a plurality of different calibration images may be holographically projected in order to provide the plurality of required displacements, for the corresponding plurality of points on the holographic replay plane.

In another example, there is provided a method of holographic projection. The method comprises projecting at least one calibration image using a first colour holographic channel and a second colour holographic channel. Each calibration image comprises at least one light spot. The method comprises performing the following steps for each calibration image in order to determine a plurality of displacements vectors at a respective plurality of different locations on the replay plane. A first step comprises projecting the calibration image onto the replay plane using a first colour holographic channel by displaying a first hologram on a first spatial light modulator and illuminating the first spatial light modulator with light of the first colour, having a first wavelength. A second step comprises projecting the calibration image onto the replay using a second colour holographic channel by displaying a second hologram on a second spatial light modulator and illuminating the second spatial light modulator with light of the second colour having a second, different wavelength. It may be said that the first and second holograms each correspond to the calibration image. However, the first and second hologram may be different to one another because they are calculated for reconstruction using light of different wavelengths. Each hologram disclosed herein is wavelength or colour-specific. A third step comprises determining the displacement vector between the light spot formed by the first colour holographic channel and the light spot formed by the second colour holographic channel. A fourth step comprises pre-processing an image for projection using the second colour holographic channel in accordance with the plurality of determined displacement vectors.

Technical advancements provided by the first aspect may be better understood in view of the following. A problem with colour image formation using a plurality of independent single colour light channels is that complex misalignments may occur. More specifically, the plurality of single colour images may be misaligned at the replay plane. The misalignment may be non-uniform or non-linear and may result from each single colour image experiencing different image translation, rotation and enlargement. The human eye is sensitive to misalignment and the perceived image quality can be significantly reduced by even a relatively small misalignment between image pixels of single colour images. The problem is particularly pronounced in a holographic system using a plurality of independent single colour holographic channels each comprising its own display device (i.e. spatial light modulator) and light source (e.g. laser diode). The problem is further pronounced in a head-up display comprising an optical replay system designed to perform complex optical processing and satisfy strict optical and physical constraints. The inventor has recognised that, in a holographic projector, spatially-variant sub-pixel manipulation of the replay plane can be achieved by pre-processing images before calculating the corresponding hologram(s). The method comprises observing the image plane with an imaging device (such as a camera) and individually assessing the alignment of corresponding light features of the two holographic replay fields at a plurality of locations on the replay plane. The method comprises projecting a light spot to a plurality of locations on the replay plane using both light channels and determining a displacement vector, between the light spot of the first colour, formed by the first light channel, and the light spot of the second colour, formed by the second light channel, at each location of the plurality of locations on the replay plane. The plurality of displacement vectors may subsequently be used to process (such as distort) at least one image for projection before the hologram corresponding to the image is determined or calculated. For example, the pixels of the image for projection may be displaced in accordance with the displacement vectors before hologram calculation.

There is disclosed herein a method in which single points, or locations, on the replay plane are assessed (or sampled) using a plurality of calibration images. In some embodiments, the same calibration image comprising at least one light spot is used to calculate a first hologram for a first colour (e.g. green) and second hologram for a second colour (e.g. red). When each hologram is displayed using the respective holographic channel and reconstructed by illumination with coherent light, the same image should be produced by each single colour channel (i.e. the green light spot should be coincident with the red light spot formed by the red hologram). However, in practice, system wide misalignments cause the respective single colour replay fields to differ even though the same image has been processed. The inventor has recognised that such system wide misalignments may be corrected by the disclosed method in which calibration images comprising at least one single light spot are holographically projected and displacement vectors between corresponding light spots are determined to provide a measure of the displacement error as a function of location on the replay plane. The determined displacement vectors may subsequently be used to provide alignment of the respective holographic reconstructions, provided by the different colour channels, of one or more images.

Each step of projecting the calibration image comprises calculating a hologram such as a Fourier hologram or Fresnel hologram. Each hologram is displayed on a spatial light modulator and illuminated with coherent light. A holographic reconstruction (i.e. single colour image) is formed on a replay plane. Light is diffracted by the features of the diffractive hologram pattern displayed on the spatial light modulator (SLM). The diffracted light interferes at the replay plane to reconstruct the desired image. In some embodiments described herein, a phase-modulation pattern is displayed on each spatial light modulator of a plurality of spatial light modulators (SLM's) and the phase-modulation pattern on at least one of the respective SLM's comprises a hologram and at least one other function such as a beam steering function—for example, a grating function (also referred to herein as a phase-ramp). In embodiments, the spatial light modulator is reflective in which case the grating function may be a function corresponding to a blazed grating.

Determining each displacement vector may comprise determining a first displacement in a first direction (e.g. x-direction) and a second displacement in a second direction (y-direction). The second direction is perpendicular to the first direction.

In embodiments, two orthogonal components of each displacement vector of the plurality or array of displacement vectors are independently or separately determined. The replay field may be contained on the x-y plane at a distance z from each spatial light modulator. In embodiments, the distance z is a function of wavelength. For example, in a first step, the displacement in the x-direction is determined and, in a second step subsequent to the first step, the displacement in the y-direction is determined.

The method may further comprise adding a grating function (also referred to herein as a phase-ramp) in the first direction to the second hologram. The method may further comprise determining the grating angle of the grating function (or gradient of the phase-ramp) that is required to align, in the first direction, a light spot formed by the second colour holographic channel with the corresponding light spot formed by the first colour holographic channel in order to determine the first displacement in the first direction (e.g. x-direction). This may be done for each of a plurality of light spots, or for each of a plurality of image pixels or image regions, on the replay field.

A phase-ramp (or grating function) displaces the replay field by a predetermined amount in the first direction, on the holographic replay plane. Phase-ramps (or grating functions) can be calculated to provide a range of displacements with high accuracy. The gradient of the phase-ramp is analogous to the grating angle of the grating function. The displacement provided by the phase ramp is linear displacement in the first direction. The first direction may be the x-direction. The phase-ramp may be combined with the hologram by addition. In embodiments, phase-delay distributions are displayed on a phase-modulating device such as a liquid crystal on silicon spatial light modulator and the phase-ramp is added to the hologram by wrapped (modulo $2\pi$) phase addition. The method may comprise modifying the phase-ramp in real-time and observing the position of the light spot—more specifically, a change in the position of the light spot—as the phase-ramp is modified. A phase-ramp is characterised by the gradient of the ramp—that is, the rate of change of the phase-delay across the ramp. The method may therefore comprise changing the gradient of the ramp in real-time and observing the position of the light spot. The method may stop when two corresponding light spots are coincident. Under these conditions, the gradient of the phase-ramp can be correlated with a displacement vector on the replay plane by simple calibration using basic geometry within the abilities of the person skilled in the art. The gradient and/or the correlated displacement vector that, according to the observations, cause the two corresponding light spots to be coincident may thereafter be used during a pre-processing step, for aligning different colour holographic reconstructions of other images (which may be referred to as 'input images' or 'target images') for the first and second colour channels. Thus the method according to the first aspect may be regarded as being, or as forming part of, a calibration method or a pre-processing method.

Likewise, the method may comprise adding a phase-ramp in the second direction to the second hologram. The method may further comprise determining the gradient of the phase-ramp required to align, in the second direction, the light spot formed by the second colour holographic channel with the corresponding light spot formed by the first colour holographic channel in order to determine the second displacement in the second direction (e.g. y-direction). This may also be done for each of a plurality of light spots, or for each of a plurality of image pixels or image regions, on the replay field.

Two perpendicular phase-ramps may be individually added to a hologram and individually modified to fine-tune the position of the replay field on the replay plane in two orthogonal directions.

The method may further comprise converting grating angles into distances or number of pixels of the SLM. The method may further comprise interpolation to provide a first displacement map of the replay plane. The method may also comprise calculating a surface fit to the plurality of second displacements to provide a second displacement map of the replay plane.

The first displacement may be measured at a plurality of locations on the replay plane. Each first displacement, at each of the respective locations, is a vector having a sign (or polarity) indicating the direction of the displacement. The array (or distribution) of first displacement vectors may be plotted as z-values on a x-y plane. The best fit may therefore be a surface fit to the z-values across an x-y plane. The first displacements are vectors in the first direction and each indicates a degree of misalignment in the first direction between the first and second single colour images at a point on the replay plane. Likewise, the second displacement may be measured at a plurality of locations on the replay plane. Each second displacement, at each of the respective locations, is a vector having a sign indicating the direction of the displacement. The array of second displacement vectors may also be plotted as z-values on a x-y plane. The surface may be a best surface fit. The second displacements are vectors in the second direction, and each indicates a degree of misalignment in the second direction between the first and second single colour images at a point on the replay plane.

Calculation of the surface fit may include interpolation (and, optionally, extrapolation) in order that all points on the replay field may be corrected even though only a subset of points on the replay field have been analysed.

Determining each displacement vector may comprise modifying the second hologram in order to reposition the light spot formed by the second colour holographic channel such that it is coincident with the light spot formed by the first colour holographic channel and determining each displacement vector from the modification required.

In alternative embodiments, a variable grating function is not added to a hologram to provide observable linear displacement of a replay field. In alternative embodiments, the hologram itself is recalculated in order to form the image spot at a displaced location when reconstructed. This may be achieved by modifying the input image used to calculate the hologram. The hologram may be recalculated plural times (i.e., the image may be modified plural times and a corresponding hologram calculated each time) until corresponding image spots are coincident on the replay plane. The person skilled in the art will be able to correlate the change made to the input image with the displacement vector on the replay plane. Again, this alternative process may be conducted independently in two orthogonal directions.

The step of pre-processing an image for projection using the second colour holographic channel may comprise receiving an image for projection, wherein the image comprises a first colour component and a second colour component. The method may comprise correcting (or modifying, or calibrating) the second colour component in the first direction using (i.e. in accordance with) the first displacement map. The method may comprise correcting (or modifying, or calibrating) the second colour component in the second direction using (i.e. in accordance with) the second displacement map.

There is therefore provided a method of aligning a plurality of single colour channels, wherein each single colour channel holographically projects a single colour image. The colour image received for projection may be an RGB (red, green and blue) image. The method may comprise independently projecting a red, green and blue image. Each single colour image may be reconstructed from a corresponding hologram. The method may therefore comprise calculating a plurality of holograms. A first displacement map may be used to align the second colour image with the first colour image in the first direction. The second displacement map may be used to align the second colour image with the first colour image in the second direction. The skilled person will understand how the displacement maps may be used to aligning the second colour image with the first colour image. For example, the desired image for the second colour may be pre-processed (such as pre-distorted or pre-warped) before being input into the hologram calculation engine. This may include, for example, adding the desired image to the anti-version or inverse of the displacement map or mirror of the displacement map. Images of the second colour are modified before hologram calculation in accordance with the first and second displacement map.

The linear displacement provided by a grating function (or linear phase-ramp) can be controlled with great accuracy. Sub-pixel displacements (e.g. $\frac{1}{10}^{th}$ pixel size) are readily achievable using the method of holographic projector disclosed herein. The linear displacement may be calculated with an accuracy of a few tens of micrometres. The displacement of image spots of a first colour may therefore be assessed with great accuracy. An error in the position of a light spot after addition of a well-characterised phase-ramp is indicative of an error introduced by the corresponding holographic projection channel. In some embodiments, the error results from the optical relay system of a head-up display. According to an embodiment, an error map (or, first and second error maps, in first and second respective directions) may be derived or otherwise provided, for accounting for, and thereby correcting, any such error in the light spot of a holographic reconstruction, for a first colour. The desired image (or, input image, or target image) of the first colour is pre-processed in accordance with the first and second error maps and then the desired image of the second colour is pre-processed in accordance with the first and second displacement maps, to align it with the corrected first colour component. It may be considered that the first colour component is aligned based on measurements with respect to an expected position and then the second colour component is aligned with the first colour component.

The method therefore improves the alignment of a first colour image and a second colour image. It will be understood that the methods disclosed herein may be extended to aligning any plurality of single colour channels with the first colour channel. One colour channel may be green, another colour channel may be red and another colour channel may be blue. According to an aspect, there is provided a method of displaying a first holographic reconstruction and a second holographic reconstruction, the method comprising receiving an image for projection, wherein the image comprises a first colour component and a second colour component, obtaining a displacement map, comprising a plurality of displacement values, for aligning the second holographic reconstruction with the first holographic reconstruction on a replay plane, and pre-processing the second colour component of the image in accordance with the displacement map. The method further comprises calculating a hologram of the first colour component and a hologram of the pre-processed second colour component, forming a first colour image on the replay plane by displaying the hologram of the first colour component on the first spatial light modulator and illuminating with light of the first colour, and forming a second colour image on the replay plane by displaying the hologram of the pre-processed second colour component on the second spatial light modulator and illuminating with light of the second colour.

The displacement map may comprise first and second displacement maps, relating to displacements in first and second respective directions, which may be orthogonal to one another.

The step of obtaining the displacement map(s) may comprise calculating one or more displacements comprised within the displacement map(s) and/or it may comprise receiving one or more displacements comprised within the displacement map(s).

The method may also comprise pre-processing the first colour component in accordance with first and second error maps, before calculation of a hologram representing the first colour component. The hologram of the first colour component may therefore comprise a hologram of a pre-processed version of the first colour component of the image. The error map may comprise first and second error maps, relating to errors (or to corrections) in first and second respective directions, which may be orthogonal to one another.

There is provided a method comprising: receiving an image for projection, wherein the image comprises a first colour component and a second colour component; pre-processing the first colour component in accordance with the first and second error maps and pre-processing the second colour component in accordance with the first and second displacement maps; calculating a hologram of the pre-processed first colour component and a hologram of the pre-processed second colour component; forming a first colour image on the replay plane by displaying the hologram of the pre-processed first colour component on the first spatial light modulator and illuminating with light of the first colour; and forming a second colour image on the replay plane by displaying the hologram of the pre-processed second colour component on the second spatial light modulator and illuminating with light of the second colour.

There is yet further provided a method of holographic projection, the method comprising: displaying a first diffractive pattern on a spatial light modulator, wherein the first diffractive pattern comprises a hologram corresponding to an image comprising an image spot; illuminating the spatial light modulator in order to form a holographic reconstruction of the image on a replay plane; detecting the first position of the image spot on the replay plane corresponding to the first diffractive pattern; adding a phase-ramp to the first diffractive pattern to form a second diffractive pattern, wherein the phase-ramp provides linear displacement of the image on the replay plane; displaying the second diffractive pattern on the spatial light modulator; illuminating the spatial light modulator in order to form a second holographic reconstruction of the image on a replay plane; detecting the second position of the image spot on the replay plane corresponding to the second diffractive pattern; calculating the change in position of the image spot. The method may be repeated, with a different phase-ramp being added to the first diffractive pattern each time, until the resulting displacement of the image on the replay plane meets a target or threshold. For example, it may be repeated until it results in the image on the replay plane being coincident with, or within a predetermined distance from, a target location on the replay plane.

There is disclosed herein a calibration image comprising an array of individual/discrete light spots or light regions. A first hologram of the calibration image is calculated for green light. A second hologram of the calibration image is calculated for blue light. A third hologram of the calibration image is calculated for red light. A first holographic reconstruction is formed using the first hologram. A second holographic reconstruction is formed using the second hologram. A third holographic reconstruction is formed using the third hologram. The first, second and third holographic reconstruction are substantially coincident on a display surface but some misalignment may exist. In some examples, a magnified, virtual image of the three holographic reconstructions is formed using an optical relay system, optionally, including a vehicle windscreen. The optical relay system introduces distortion that is wavelength dependent. The present disclosure describes a method that provides end-to-end alignment correction by individually repositioning pixels of the three single colour images. The method is possible because the "image pixels" are light spots formed by (holographic) projection. By contrast, it would not be possible in a conventional display—e.g. a TFT display panel—as the image pixels in a conventional display cannot be individually repositioned because the image pixels are the physical liquid crystal cells of the display panel. The term 'end-to-end alignment correction' is used to reflect that the method disclosed herein may be used to compensate for all misalignments in the entire system caused by chromaticity including those introduced by relay optics or an optical combiner such as a windscreen. The present disclosure is characterised by the individual repositioning of image pixels, or image regions, on the replay plane for the holographic reconstruction(s) of the image in one or more distinct colours. The present disclosure is further characterised by the use of two orthogonal displacement maps determined using a software grating function combined with a hologram of the target image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Reference is made throughout this disclosure to a "grating function" by way of example only of a function that provides a linear translation of the replay field. That is, an array of light modulation values which, when added to the hologram, linearly displaces the replay field by a defined magnitude and direction. The displacement may be measured in pixels, millimetres or degrees. The phase-ramp may also be referred to as a phase-wedge. The phase values of the phase-ramp may be wrapped (e.g. modulo $2\pi$). A wrapped phase-ramp may be considered a phase grating. However, the present disclosure is not limited to phase-only modulation and the terms "grating function", "software grating" and "blazed grating" may be used as examples of a beam steering function such as a wrapped modulation ramp. A phase-ramp may be characterised by its phase gradient. The term "grating function" is preferred in the present disclosure because the associated grating angle is a key component of the method disclosed. In accordance with the present disclosure, a first phase-ramp may be used to displace a replay field in a first direction and the phase gradient of the first phase-ramp is the rate of change of the phase value in a second direction, wherein the second direction is perpendicular to the first direction.

In accordance with this disclosure, single colour images are holographically projected onto a replay plane. The process requires determination, such as calculation, of a hologram corresponding to each image for projection. The present disclosure relates to methods in which images are processed or modified before the hologram is calculated. The term "pre-processing" may be used to reflect that this processing or modifying step occurs before the hologram is calculated. The terms "pre-distorting" and "pre-warping" may be used as examples of pre-processing. The pre-processing may comprise processing the image using simple addition, subtraction, multiplication or division.

The term "light feature" is used herein to refer to an area of the replay field which is illuminated by the corresponding light channel. The illuminated area defined by a "light feature" is a relatively small area compared to the size of the replay field. The light feature may have any shape such as circular, elliptical, square or rectangular. The light feature is an area of relatively high brightness compared to other areas of the replay plane. The light feature may have a shape or brightness that is regular or irregular, symmetric or asymmetric. The image formed by holographic projection may be formed from a number of image dots or pixels. Each "light feature" in accordance with the present disclose may comprise one or more pixels of the replay field. In some embodiments, the light feature is one image pixel, wherein an image pixel is the smallest picture element that may be formed by the display system. Alternatively, it can refer to an image area or image region that encompasses one or more image pixels. An image region may comprise a plurality of image pixels, for example 5 to 10 image pixels, or for example 20 to 40 image pixels. Each image region may be of a particular shape, such as a circular, elliptical, or oval shape. An image region may not be restricted to comprising whole image pixels but may intersect (i.e. may overlap with only a part, or a sub-section, of) one or more image pixels.

The present disclosure describes methods including observing light spots on a display plane. The display plane may comprise a screen arranged to directly receive spatially-modulated light from each spatial light modulator. This plane may be considered the primary holographic replay plane because it is the plane on which the single colour images are reconstructed—that is, the plane on which the spatially-modulated light interferes to form the image. However, the primary replay plane may be one plane of a plurality of planes on which each single colour image is visible. Notably, the present disclosure extends to observing and adjusting the position of light spots observed on a secondary display plane. The secondary display plane may be an image of the primary display plane. An image of each single colour replay field may be formed on a secondary display plane using optics.

The secondary display plane may be a virtual image display plane. Specifically, the display plane referred to herein may be the virtual image plane of a head-up display. The head-up display may comprise an optical replay system arranged to image the calibration images formed on the primary display plane. The methods disclosed herein may be conducted by observing the image spots on a secondary display plane which is a virtual image of a primary display (e.g. replay) plane. The methods disclosed herein may therefore be used to further correct for misalignment issues introduced by the optical replay system and/or windscreen of a head-up display.

Reference is made herein to translating light features to bring them into alignment with other light features using a grating function characterised by a grating angle. The grating function is combined (namely, summed) with a hologram to form a diffractive pattern that is displayed on a spatial light modulator. It should be understood that the grating component of the diffractive pattern moves the entire holographic replay field formed by the hologram component of the diffractive pattern. Reference to translating a light feature therefore means translating the entire holographic replay field including the light feature until the light feature is positioned as required. In accordance with this disclosure, each light feature of a plurality of light features is aligned one-by-one by displacing the holographic replay field. That is, the position of each light feature is monitoring during the alignment process without regard to the other light features of the plurality of light features.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
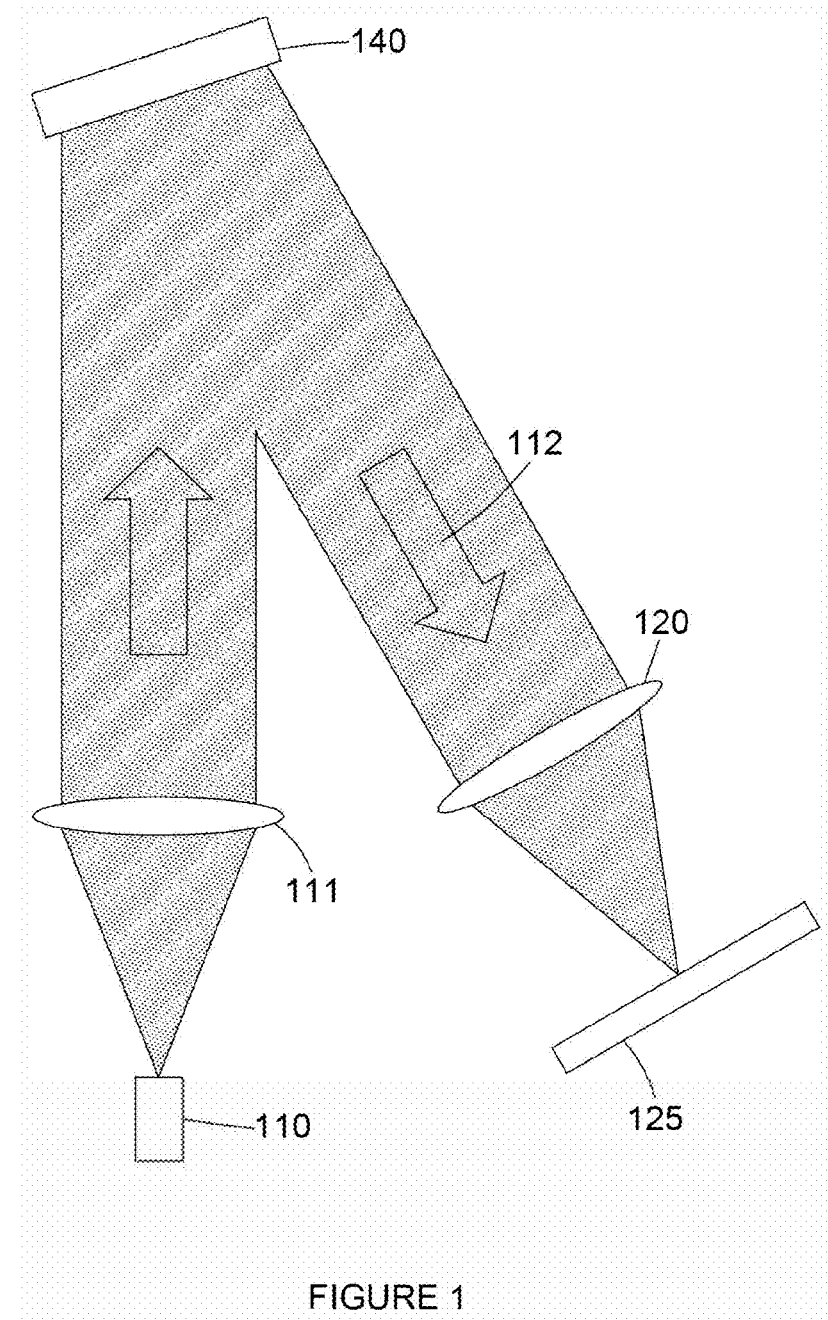
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
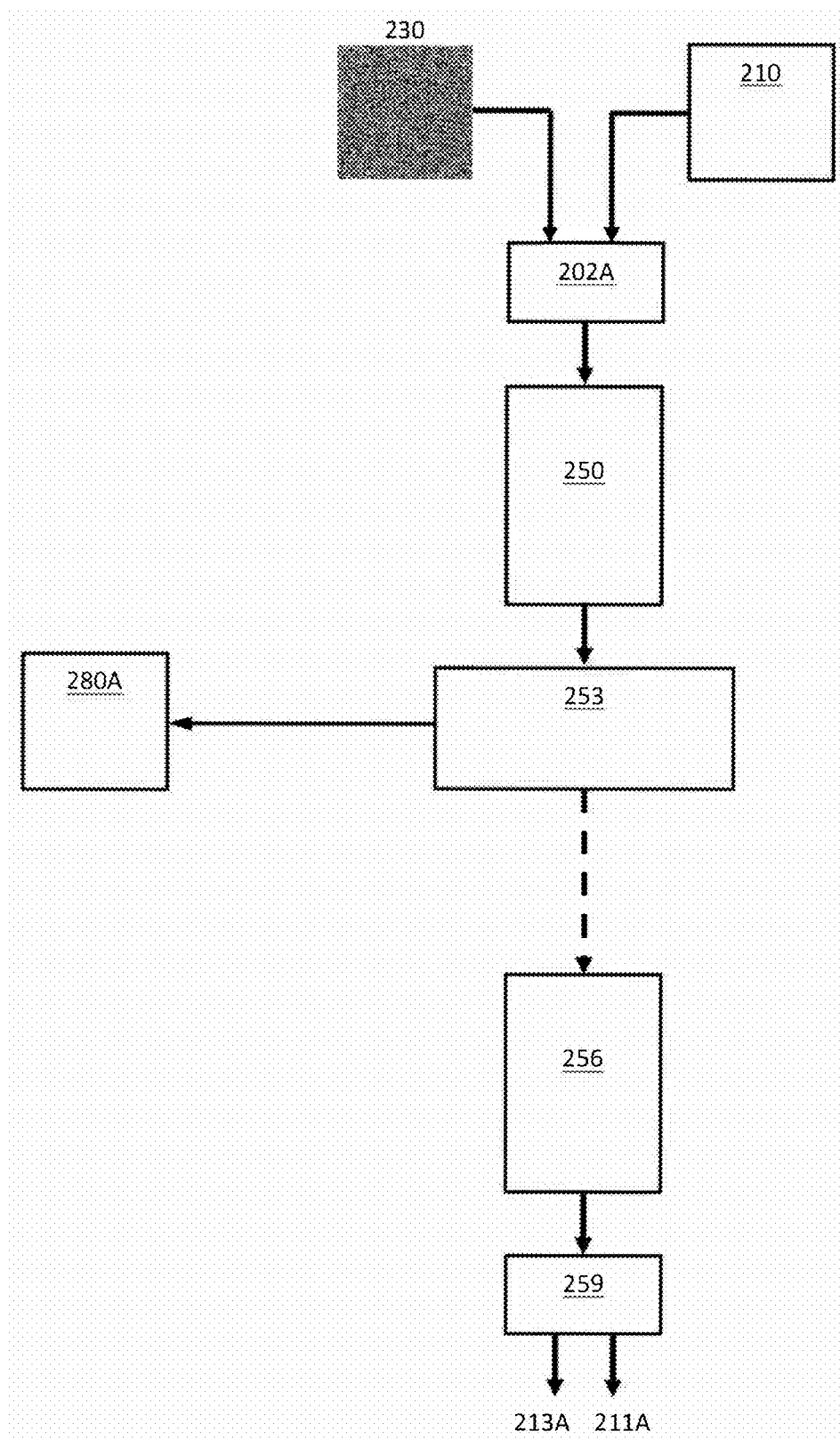
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
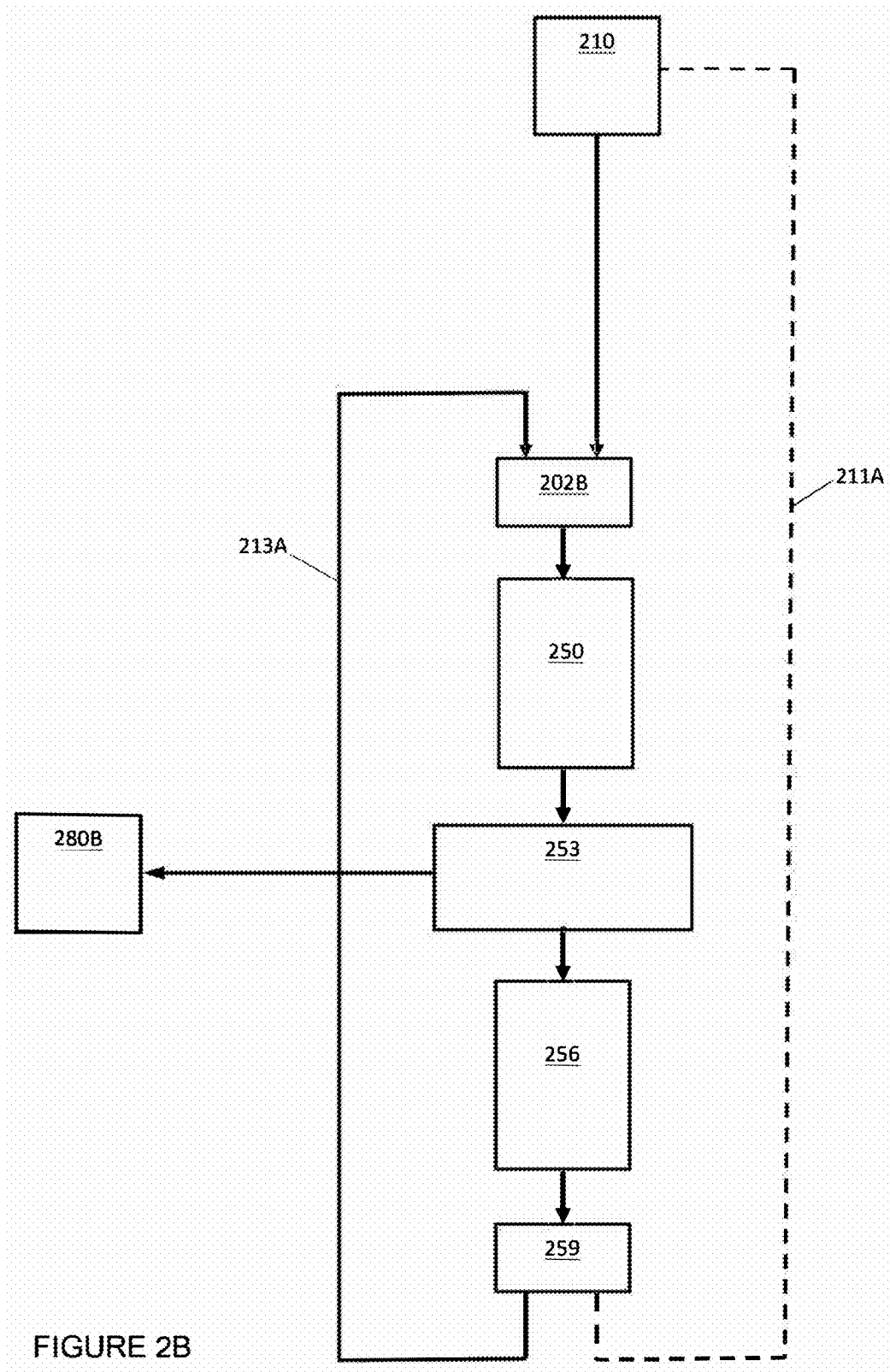
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
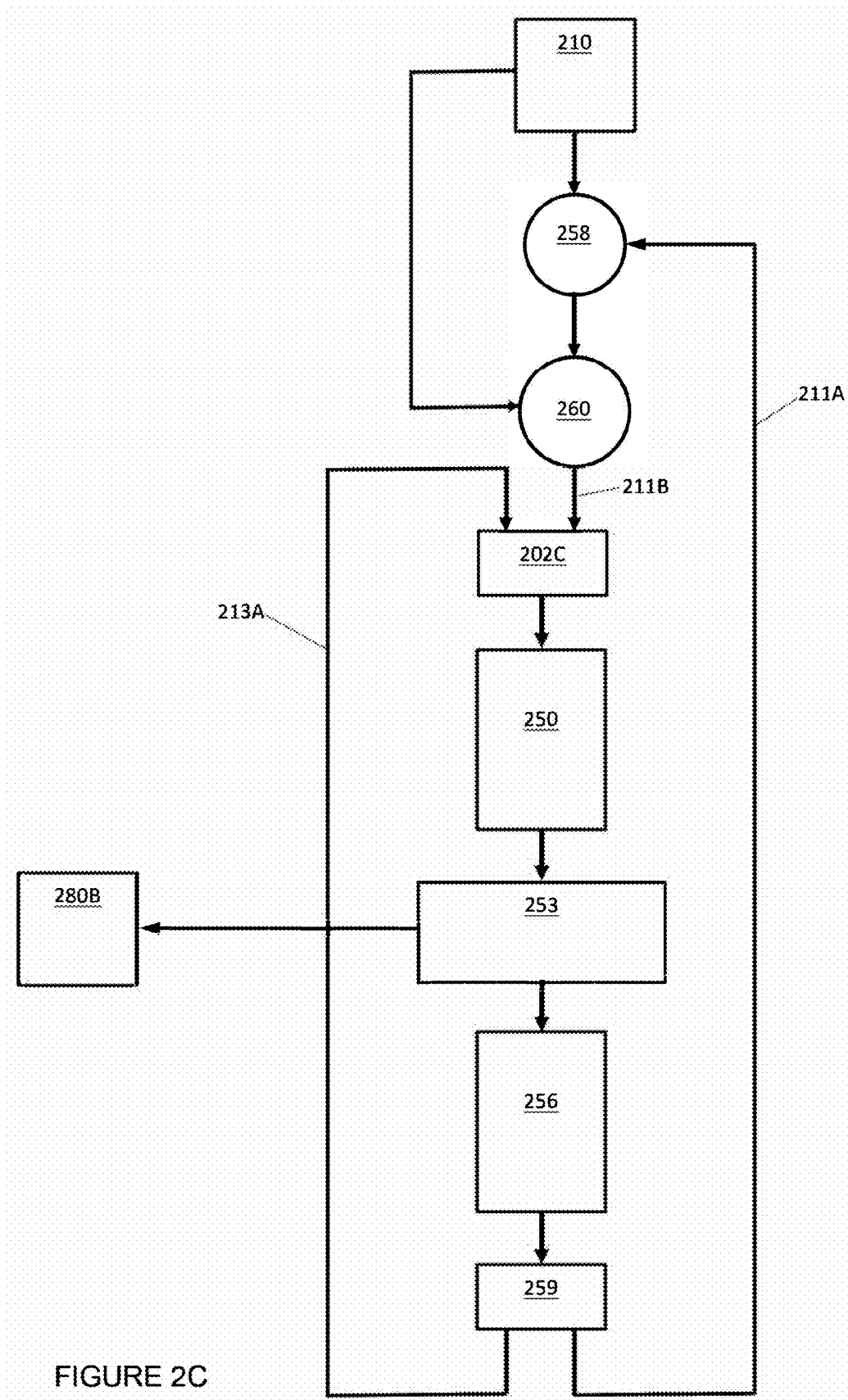
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field of computer-generated holography how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known in the field of computer-generated holography how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
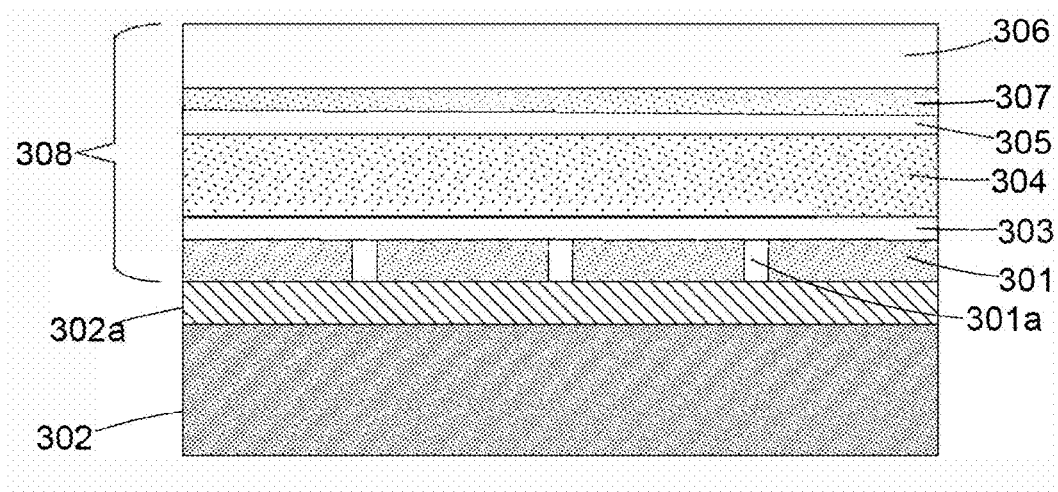
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.
Single Colour Channels The present disclosure relates to a system comprising a plurality of single colour channels. Each single colour channel comprises a single colour holographic projector forming a single colour holographic reconstruction (i.e. image or picture). A plurality of single colour pictures is formed on a common replay plane. The present disclosure describes a method of aligning a plurality of independently-formed single colour holographic reconstructions on a display (e.g. replay) plane. A full colour picture may be formed using coincident red, green and blue pictures. In some embodiments, the hologram is a Fourier hologram. In other embodiments, the hologram is a Fresnel hologram.

Figure 4:
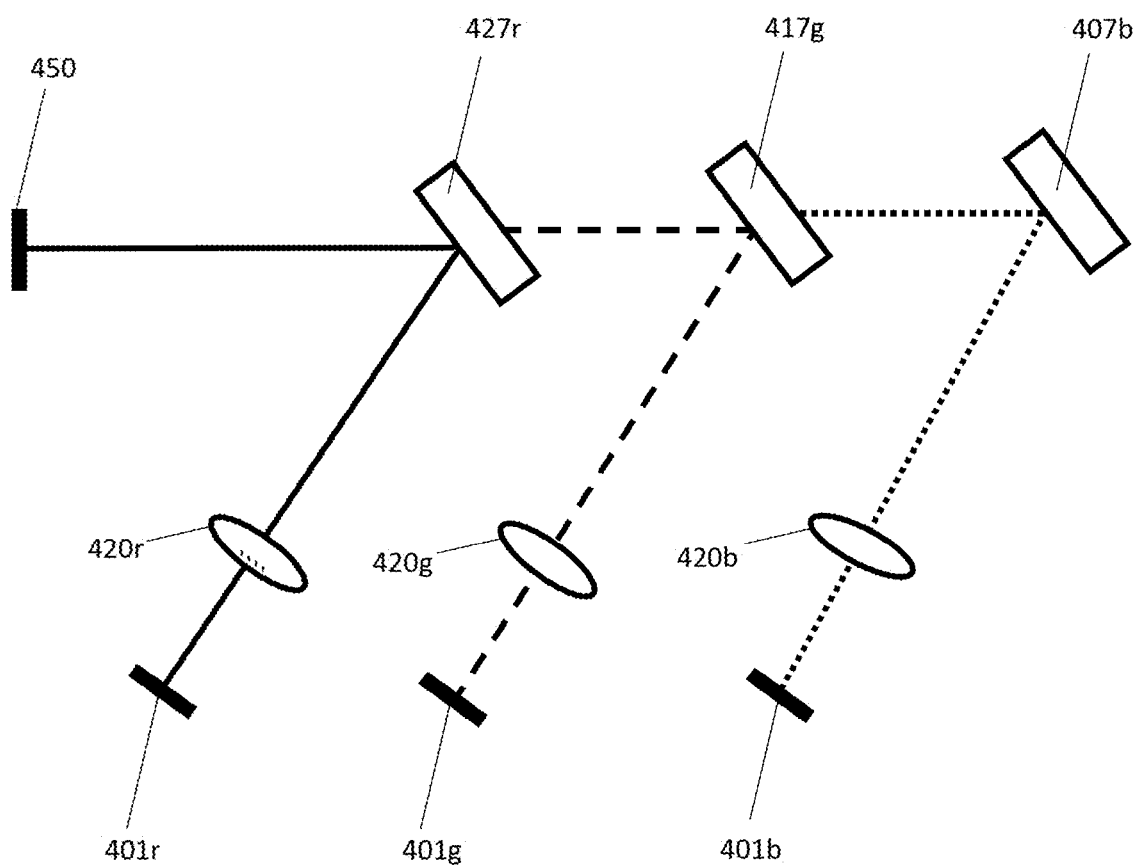
FIG. 4 shows a plurality of independent single colour holographic channels in accordance with the present disclosure.

FIG. 4 shows red, green and blue colour channels. The red channel comprises a first spatial light modulator 401r, a first lens 420r and a first mirror 427r. The green channel comprises a second spatial light modulator 401g, a second lens 420g and a second mirror 417g. The blue channel comprises a third spatial light modulator 401b, a third lens 420b and a third mirror 407b. Each single colour channel forms a single colour holographic reconstruction (or picture) on replay plane 450. The present disclosure describes a method of aligning the plurality of single colour pictures on the replay plane 450. The first lens 420r, second lens 420g and third lens 420b are optional. If each displayed hologram is a Fourier hologram, the first lens 420r, second lens 420g and third lens 420b may contribute to the Fourier transform of each respective hologram.

The first spatial light modulator 401r displays a hologram corresponding to a red image. The first spatial light modulator 401r is illuminated with red light. The first lens 420r receive spatially modulated light from the first spatial light modulator 401r and forms a red image on the replay plane 450. The first mirror 427r is disposed between the first lens 420r and replay plane 450.

The second spatial light modulator 401g displays a hologram corresponding to a green image. The second spatial light modulator 401g is illuminated with green light. The second lens 420g receive spatially modulated light from the second spatial light modulator 401g and forms a green image on the replay plane 450. The second mirror 417g is disposed between the second lens 420g and replay plane 450.

The third spatial light modulator 401b displays a hologram corresponding to a blue image. The third spatial light modulator 401b is illuminated with blue light. The third lens 420b receive spatially modulated light from the third spatial light modulator 401b and forms a blue image on the replay plane 450. The third mirror 407b is disposed between the third lens 420b and replay plane 450.

The first mirror 427r is a first dichroic mirror arranged to reflect red light and transmit green and blue light. The second mirror 417g is a second dichroic mirror arranged to reflect green light and transmit blue light. The third mirror 407b is reflective to blue light.

Each single colour light path comprises a first part from spatial light modulator to mirror and second part from mirror to replay plane. In embodiments, the first parts of the single channels are spatially-offset but substantially parallel. In embodiments, the second parts of the single channels are substantially colinear.

The red light path from the first spatial light modulator 401r to replay plane 450 comprises a reflection off the first mirror 427r. The green light path from second spatial light modulator 401g to replay plane 450 comprises a reflection off second mirror 417g followed by a transmission through the first mirror 427r. The blue light path from third spatial light modulator 401b to replay plane comprises a refection off third mirror 407b followed by a transmission through the second mirror 417g and then a transmission through the first mirror 427r. The replay plane 450, first mirror 427r, second mirror 417g and third mirror 407b are substantially colinear. The blue path length is greater than the green path length which is greater than the red path length. Specifically, in embodiments, the second part of the blue light path is longer than that of the green light path which is, in turn, longer than that of the red light path. In these embodiments, the first parts may be substantially equal in length.

Each single colour channel may be used to form a holographic reconstruction within a replay field area. The red replay field may contain the red picture content of a picture. The green replay field may contain the green picture content of the picture. The blue replay field may contain the blue picture content of the image. The person skilled in the art will be familiar with the idea of forming a picture by superimposing red, green and blue picture content using red, green and blue colour channels. The alignment of the red, green and blue replay fields is crucial to image quality. Each single colour picture may comprise image pixels. In the case of holographic projection, the image pixels may be referred to as light spots.

In some embodiments, a magnified image of the colour picture is formed. In some embodiments, the image formed is a virtual image. In some embodiments, the colour picture is the picture of a picture generating unit of a head-up display in a vehicle. A virtual image of the colour picture may be formed by magnifying optics (e.g. a mirror) of the head-up display and an optical combiner such as the windscreen of the vehicle.

Figure 5A:
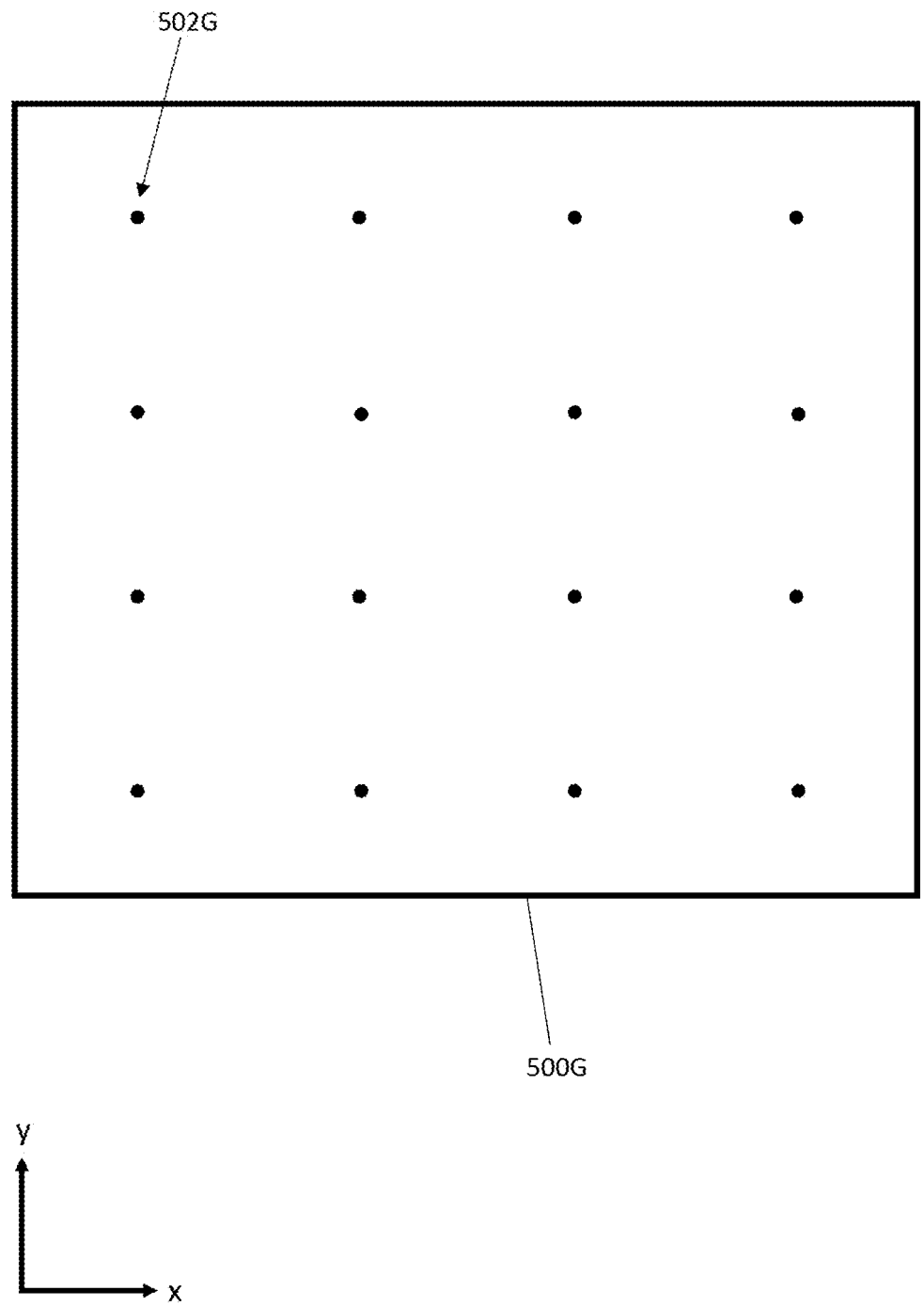
FIG. 5A shows an example array of light spots of a first colour.

FIG. 5A shows a plurality of single colour light spots of a first colour (e.g. green), such as image spot 502G, in a holographic replay field 500. The plurality of single colour light spots is formed as part of an alignment or calibration process in accordance with the present disclosure. The plurality of light spots may be arranged in a regular or irregular array. That is, the light spots may be evenly or unevenly spaced in the x- and y-direction. In FIG. 5A, sixteen light spots are shown by way of example only. The concepts described herein are applicable to any number of light spots. The dimensions of the replay field are much greater than the dimension of the light spot. Each light spot may be an image pixel. That is, each light spot may be the smallest feature that can be formed on the replay field by the system. Alternatively, each light spot may comprise more than one image pixel, in whole or in part.

The light spots may be formed at the same time using a single hologram or they may be formed using a plurality of holograms. Each hologram may form one light spot or a subset of the plurality of light spots in a frame sequential scheme. For example, a first light spot may be formed at a first time using a first hologram and a second light spots may be formed at a second time, different to the first time, using a second hologram. In embodiments, a light detector such as a spatial light detector (for example, a camera such as a CCD camera) is used to capture images of the holographic replay field 500G. The camera may be distortion-free or distortion-corrected.

Alignment Method Using Software Grating

Embodiments describe a method of monitoring the image spots of a first holographic reconstruction and the corresponding image spots of a second holographic reconstruction. The method may be performed by monitoring the holographic replay plane (that is, the plane in space on which the first and second holographic reconstructions are formed). The method may also be performed by monitoring an image (such as a magnified image or magnified, virtual image) of the first and second holographic reconstructions. In some embodiments, the method is performed by monitoring the image from the viewing plane (e.g. eye-box or eye-motion-box) of a head-up display in a vehicle. The monitoring may be performed using machine vision.

The same calibration picture comprising light spots is holographically reconstructed by each of a first holographic channel and a second holographic channel. In a perfect system, the two sets of light spots, as holographically reconstructed by the respective first and second holographic channels, would be coincident. That is, each light spot of the first holographic reconstruction would be coincident with the corresponding light spot of the second holographic reconstruction. However, the skilled person will appreciate that, in practice, the light spots of the first holographic reconstruction may not be perfectly aligned with the light spots of the second holographic reconstruction.

Figure 5B:
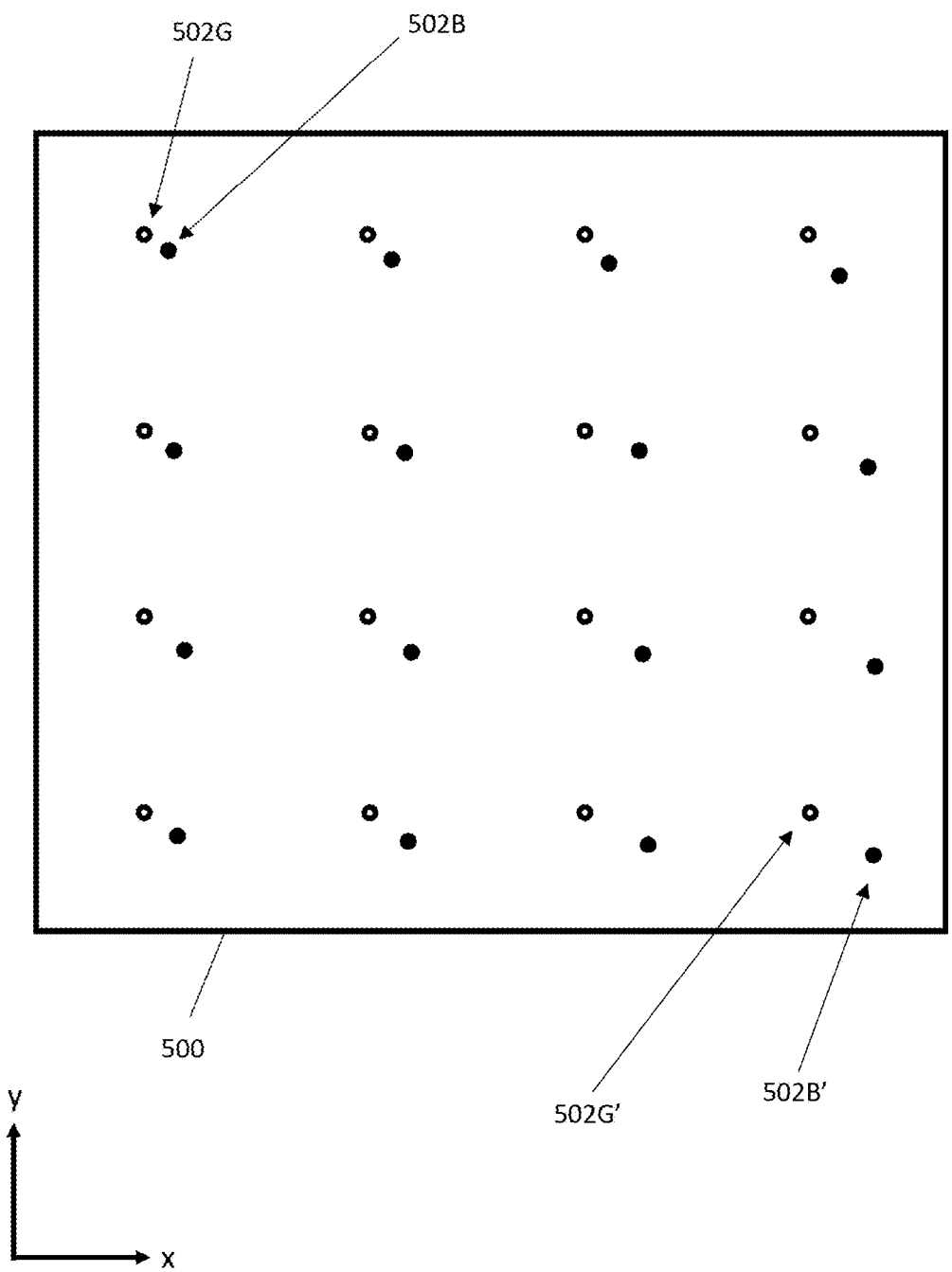
FIG. 5B shows a first colour holographic reconstruction of the array of light spots and a second colour holographic reconstruction of the array of light spots.

FIG. 5B shows a first array of light spots including first green light spot 502G and second green light spot 502G' formed by a first (green) holographic channel and a second array of light spots including first blue light spot 502B and second blue light spots 502B' formed by a second (blue) holographic channel. The light spots of the first holographic channel are misaligned with respect to the light spots of the second holographic channel. Notably, the misalignment is a function of position on the replay field 500. That is, the extent of the misalignment may vary across the replay field. FIG. 5B shows a first pair of corresponding light spots comprising first green light spot 502G and first blue light spot 502B. FIG. 5B shows a second pair of corresponding lights spots comprising second green light spot 502G' and second blue light spot 502B'. In this example, the magnitude of the misalignment of the first light spots 502G and 502B in the x- and y-direction is less than that of the second light spots 502G' and 502B' in the x- an y-direction.

Figure 6A:
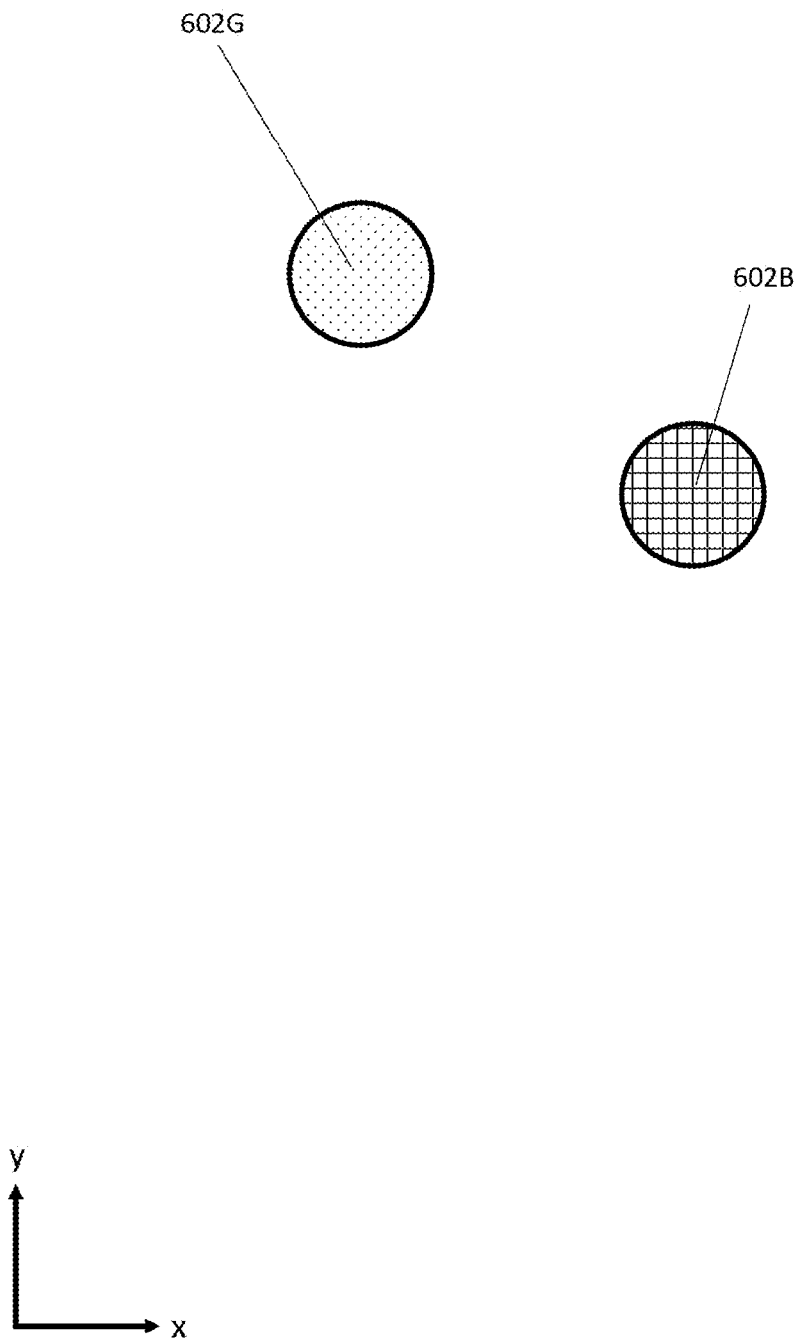
FIG. 6A shows an example misalignment between a first colour light feature and the corresponding second colour light feature.

An image capture device (e.g. camera) is arranged to capture an image of the light spots. Again, in some embodiments, the image is captured from the eye-motion-box of a head-up display. The image capture device may magnify the image. FIG. 6A shows the first green light spot 602G and the first blue light spot 602B captured by the image capture device. In some embodiments, the method described herein is repeated for a plurality of different positions with the eye-motion-box of the head-up display.

A holographic replay field may be linearly displaced/translated on the replay plane by adding a grating or phase-ramp function to the hologram as described above. This amounts to superimposing the hologram and grating function. The grating function therefore translates the image spots of the holographic reconstruction on the replay plane. In some embodiments, an x-direction grating and a y-direction grating are both superimposed with (e.g. added to) the hologram in order to provide alignment on the x-y display plane, between one or more spots of the holographic reconstruction that is formed by illuminating the hologram to which they are superimposed and one or more corresponding spots of another holographic reconstruction. The amount of translation provided by the grating depends on the grating angle of the grating. The grating angle is software controlled. In summary, the inventors have realised that by measuring the grating angle required in the x- and y-direction to align a pair of corresponding light spots, the amount of misalignment in the x- and y-direction can be measured at each point of a plurality of points on the replay field. In some embodiments, an x-correction map and a y-correction map are each determined for the replay field area. The x- and y-correction maps, once determined, may be subsequently used to process an image before holographic projection in order to improve alignment. The method is described in more detail below.

Figure 6B:
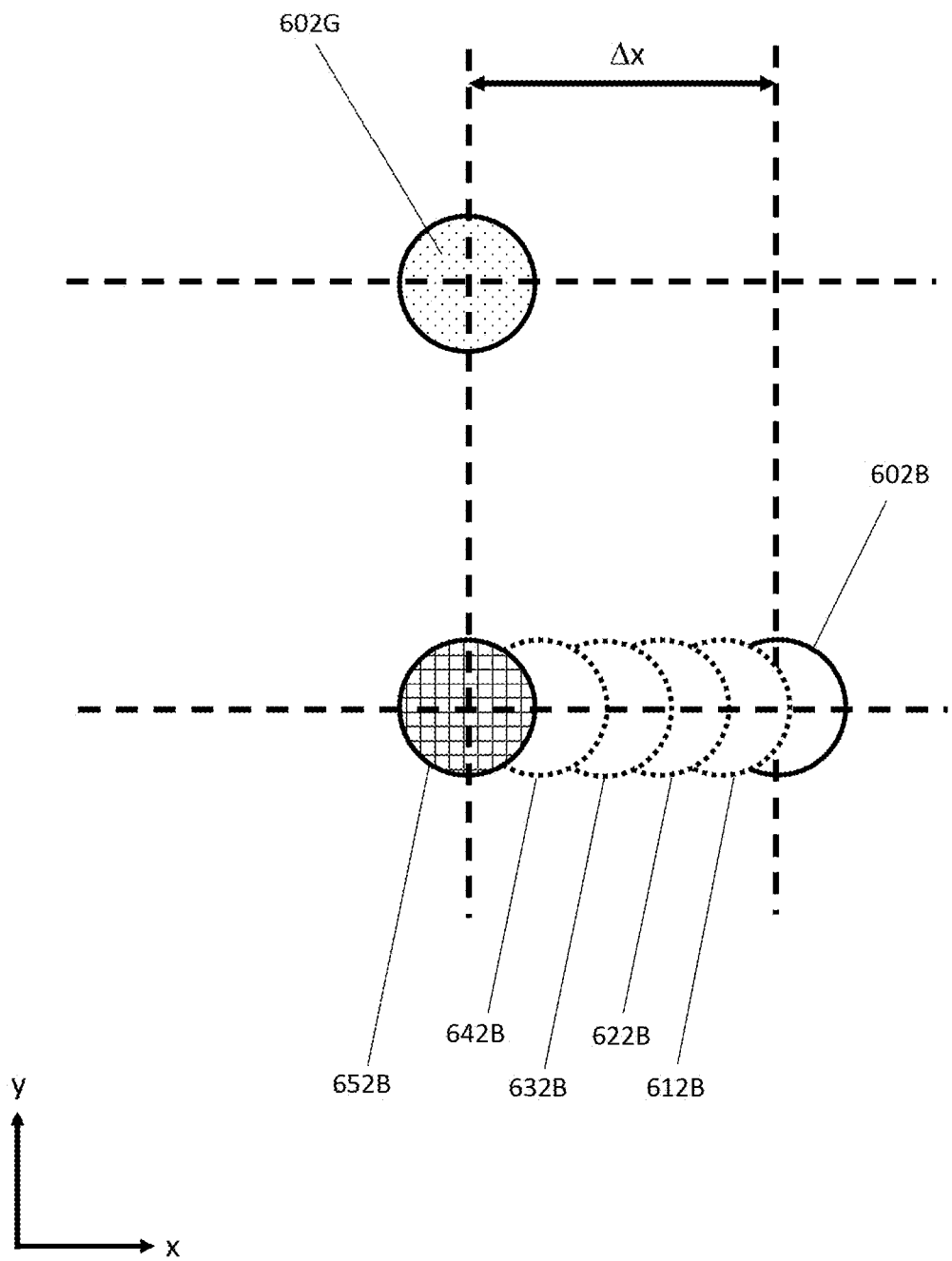
FIG. 6B shows how the position of the second colour light spot may be changed using an x-direction grating.

FIG. 6B shows how the first blue light spot 602B may be aligned in the x-direction with the first green light spot 602G using a grating (or phase-ramp) in the x-direction. The angle of the grating may be changed (in software) until alignment in the x-direction is achieved. A plurality of different period gratings (i.e. different grating angles) give rise to a corresponding plurality of different positions 612B, 622B, 632B, 642B and 652B. The grating angle of the x-direction grating may be changed (e.g. increased in magnitude) until the image capture device shows that alignment in the x-direction is achieved. It will be understood that the grating may provide a positive translation (to the right in FIG. 6B) or negative translation (to the left in FIG. 6B) of first blue light spot 602B. For the avoidance of doubt, FIG. 6B shows the position of first blue light spot 602B when five different grating angles are used to provide five different respective negative translations in the x-direction. A first grating angle gives rise to position 612B. A second grating angle, having a magnitude greater than the first grating angle, give rise to a position 622B etc. During the process of alignment, the hologram/s giving rise to the light spot/s does not need to be recalculated. Instead, the grating function is changed and the superposition (e.g. sum) of the hologram and grating function is recalculated. This process can be performed in real-time. A plurality of different grating functions may be stored in memory and recalled as necessary in an automated process, for example, using image processing to determine light spot positions. The hologram and grating function may be superimposed/added by a display driver (e.g. field-programmable gate array or application-specific integrated circuit) of the system. In some embodiments, the grating function is calculated in real-time using the grating equation. The display driver may drive the first and second holographic projection channel. A hologram engine determines holograms that are provided to the display driver. The hologram engine may selectively retrieve holograms from memory or, in some examples, calculate holograms (e.g. in real-time).

The grating function is added to the hologram to form a diffractive pattern that is displayed on the spatial light modulator. The diffractive pattern is a distribution of grey-level values (e.g. phase-delay values) that cause diffraction. The diffracted light forms the holographic reconstruction on the display plane owing to light interference. The grating function is a distribution of grey-level values that define a grating satisfying the grating equation. The defining parameters of the light and spatial light modulator determine the angle, $\theta x$, of the grating in accordance with the well-known grating equation:

$$n\lambda = d \sin \theta$$

In summary, the method comprises determining the angle, $\theta x$, of the x-direction grating required to achieve alignment in the x-direction.

Figure 6C:
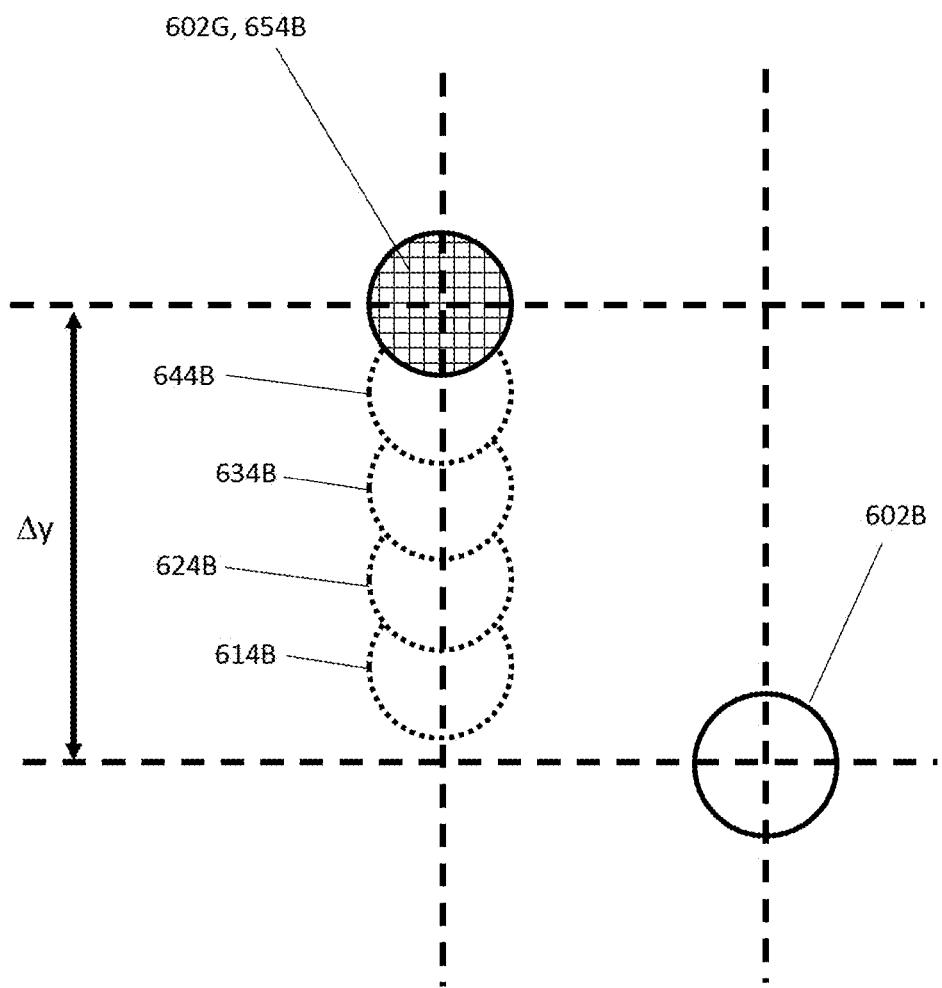
FIG. 6C shows how the position of the second colour light spot may be changed using a y-direction grating.
Figure 6C:
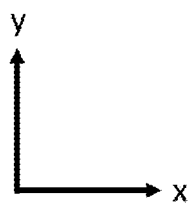

FIG. 6C shows how the process may be repeated using a y-direction grating to establish alignment between the first green light spot 602G and first blue light spot 602B in the y-direction. FIG. 6C shows example position of the first blue light spot (614B, 624B, 634B, 644B, 654B) for a plurality of different gratings having a grating angle, $\theta y$.

Alignment is determined by monitoring the light spots using the image capture device. The skilled person will understand that image analysis software may be used to automate the alignment process, and coordinate with the display driver regarding the grating applied to the hologram.

The angle per pixel can be calculated from the diffraction angle and resolution of the spatial light modulator using simple geometry within the abilities of the person skilled in the art. The method therefore further comprises converting the angles $\theta x$ and $\theta y$ into a number of pixels in $\Delta x$ and $\Delta y$, respectively. Notably, sub-pixel accuracy is achieved using this method. In some embodiments, the units of $\Delta x$ and $\Delta y$ is pixels. In some embodiments, $\Delta x$ and $\Delta y$ are converted in a distance (e.g. micrometres) based on the pixel size of the display device.

Notably, the method is repeated to give a measure of $\Delta x$ and $\Delta y$ at each of the sixteen different locations of the blue light spots shown in FIG. 5B by individually calculating $\Delta x$ and $\Delta y$ at each location using the grating method disclosed herein. That is, $\Delta x$ and $\Delta y$ are measured for each blue light spot of the sixteen blue light spots, wherein each measured value of $\Delta x$ and $\Delta y$ represents the x- and y-displacement between a blue light spot of the array of blue light spots and its corresponding green light spot. Again, sixteen locations are shown and described by way of example only. The method comprises individually aligning each light spot of a second colour with the corresponding light spot of the first colour. The same light pattern comprising an array of light spots is holographically projected onto the replay plane using a first colour channel and a second light channel. The array of light spots of the second colour may be formed simultaneously using one hologram or formed one at a time using a plurality of holograms in a frame sequential scheme described below. Each light spot of the second colour is aligned with the corresponding light spot of the first colour in turn. That is, the light spots are aligned one at a time. In some embodiments, this is achieved by adding a variable grating function to the hologram and changing the grating angle of the grating until the pair of light spots are aligned. In other embodiments, alignment is achieved by changing the input image used to calculate the hologram so as to reposition the first blue image spot relative to the first green light spot.

A first array of first displacement values is determined, wherein each first displacement value represents the positional offset between the second colour light spot and the corresponding first colour light spot in a first (e.g. x) direction. A second array of second displacement values is determined, wherein each second displacement value represents the positional offset between the second colour light spot and the corresponding first colour light spot in a second (e.g. y) direction. The first and second direction may be orthogonal. The first array of first displacement values may be represented by vectors on a x-y plane and a surface fit may be performed including interpolation and/or extrapolation. The second array of second displacement values may be also be represented by vectors on a x-y plane and a second surface fit may be performed including interpolation and extrapolation.

Figure 7A:
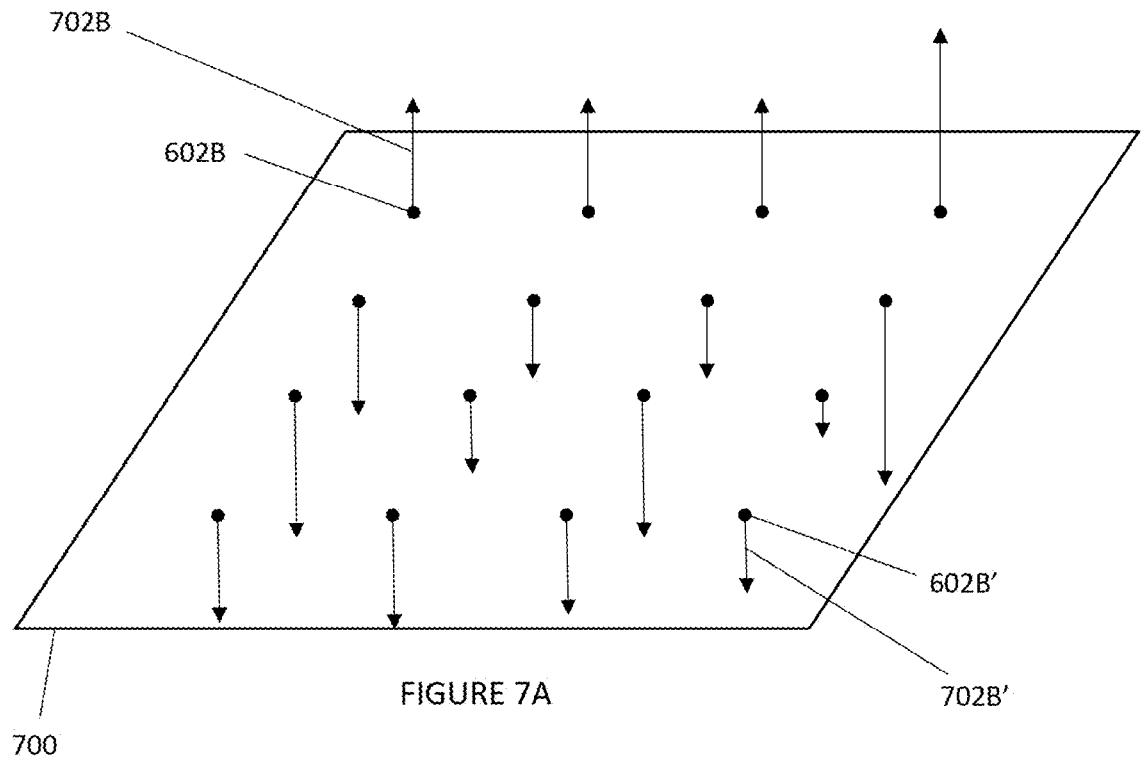
FIG. 7A shows an array of displacement vectors on the replay plane.

FIG. 7A shows a graphical representation of the example displacement values of FIG. 5B (i.e. x-direction displacements at each replay plane locations).

The plane 700 shown in FIG. 7A corresponds to plane 500 of FIG. 5B. The sixteen blue light spots, including first blue light spot 602B and second blue light spot 602B', are arranged in a regular array on plane 700. A vector is associated with each blue light spot. The vector is perpendicular to the plane 700 and represents $\Delta x$. The magnitude of the vector is the magnitude of $\Delta x$ and the direction of the vector (up or down, as shown in FIG. 7A) represents the direction of the displacement $\Delta x$. For example, an upwardly pointing vector in FIG. 7A may represent a positive $\Delta x$ and a downwardly pointing vector in FIG. 7B may represent a negative $\Delta x$. A second array of vectors (not shown) is used to represent the measured values of $\Delta y$ at the sixteen locations of the blue light spots.

Figure 7B:
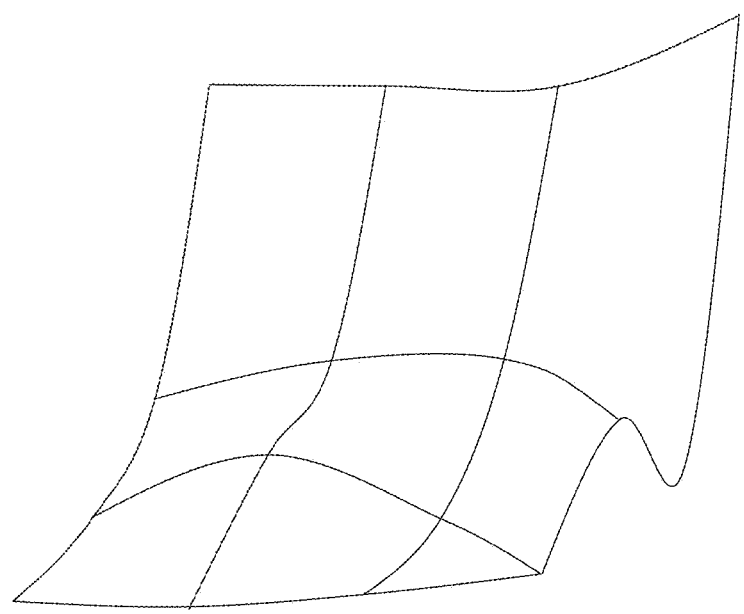
FIG. 7B shows a surface formed by interpolation of the displacement vectors.

In a further step of the method illustrated by FIG. 7B, a surface is fitted to the measured data, optionally, by interpolation. The surface may be referred to herein as a displacement map. The displacement map described in relation to the Figures is a displacement map of the total/entire replay field in the x-direction for blue. That is, the displacement map represents the distortion of the blue holographic image relative to the green holographic image. The best fit surface may optionally be extrapolated to the edges of the holographic replay field. Therefore, even though only a subset of positions in the replay field have been assessed by the grating method, the surface includes interpolation (and, optionally, extrapolation) such that all points in the holographic replay field may be adjusted using the displacement map.

For the avoidance of doubt, the method is repeated in the y-direction using a grating in the perpendicular direction to form a second displacement map. Accordingly, the position of each light spot on the replay plane may be corrected in two-dimensions using the first and second displacement maps. The method may be repeated for a third colour—e.g. red.

As mentioned above, the arrangement of image spots shown in FIGS. 5A to 7B is just one possible example. The methods described herein may be applied to any arrangement of spots or light features, to align first and second respectively differently-coloured holographic reconstructions of an image, such as a calibration image. According to embodiments, the image (such as a calibration image) for which the spots or light features are aligned does not comprise dots or spots that each correspond to a single image pixel. Instead, the image comprises larger light features, each of which encompasses (or is comparable in size to) a plurality of image pixels. The image regions may be arranged in a regular pattern or in an irregular pattern. Each image region may be substantially the same size and/or shape as each of the respective others.

For example, a calibration image may comprise a plurality of light features, each of which is substantially a circle. Each circle may be similar in size to approximately 5 to 10 image pixels. The size of each circle may be determined, for example, by the size of light feature that a camera or other light detector is configured to detect. Each circle may not exactly encompass a whole number of image pixels but may be sized and/or positioned to intersect one or more individual image pixels. Separate holograms of the calibration image may be provided, for respective illumination by each of two or more colours of light—e.g. red light, green light and blue light—and the resulting holographic reconstructions may be aligned to one another, by positioning the corresponding image regions of each colour to be coincident with one another, using similar techniques to those described above in relation to FIGS. 5A to 7B.

As the skilled reader will be aware, the replay fields comprising the respective holographic reconstructions of the image, in the different colours, may be of different respective sizes. For example, this may be the case when the coloured light channels are comprised within a waveguide pupil expander (which will be familiar to the skilled reader). Therefore, although the image regions may be aligned to have the same centre and radius for all three colours, in geometric space (e.g. on the face of a diffuser or other light receiving member that displays the holographic reconstructions), such alignment will actually correspond to the image regions occupying different respective coordinates for each colour, in their respective pixel spaces. Therefore, the present inventor has found that it may be beneficial to make use of image regions, each of which is larger than a single image pixel, rather than trying to align pixels, bearing in mind the different pixels coordinate systems that will exist at the replay field, for each respective colour of holographically reconstructed image. The use of image regions that are larger than individual image pixels may also enable machine vision to be used more successfully, for detecting and aligning the positions of the light features at a replay plane.

Although the image regions themselves may be larger than individual image pixels, their centres may have sub-pixel coordinates. Therefore, the use of image regions can still provide measurement and/or positioning on a sub-pixel scale, and may be compatible with other methods that require high sub-pixel accuracy, such as the use of antialiasing algorithms for reducing the appearance of jagged edges in an image.

Image Distortion Using Fitted Surface

When fitted surfaces have been derived as described above in relation to FIGS. 7A and 7B, they may be used to process images (e.g. blue and red images) before hologram calculation. As a result, the differently-coloured holographic reconstructions of the image, which result from illumination of the respective holograms, should be aligned with one another, without the need to add a grating function to one of the holograms.

The skilled person will be familiar with the idea of distorting an image to exactly compensate for any distortions, such as chromatic distortions, caused by e.g. optics. In accordance with this disclosure, images are distorted before hologram calculation. The input to this process is an undistorted, target/input image for projection and the output is a distorted/modified image. The distorted image is input to the hologram engine. That is, a hologram of the distorted image is calculated. Each image, including the input image, comprises an array of image pixels, wherein each image pixel has a grey level. Pixel values of the distorted image are calculated from pixel values of the target input. Two example methods are disclosed below.

In a first example, each pixel of the input image is effectively displaced on the array of pixels of the display device in accordance with both fitted surfaces. That is, the pixel values of the target image are effectively moved to form the distorted image. If this process causes more than one pixel value to be associated with the same pixel of the target, the average grey level may be used or a weighted grey level may be used, wherein the weighting depends on the magnitude of pixel displacement, for example. The process may lead to some pixels being unassigned a grey level value. The first example provides accuracy to the nearest pixel.

In a second example, sub-pixel accuracy is provided. In the second example, a new x- and y-coordinate for each pixel is determined by adding $\Delta x$ and $\Delta y$ to the corresponding x and y coordinate. Each pixel of the target image has an x-coordinate value and a y-coordinate value. The best fit surfaces provide an $\Delta x$ and $\Delta y$ value for pixel of the target image. A new coordinate pair (i.e. x and y) can be defined for each target image pixel by adding the respective value of $\Delta x$ and $\Delta y$ at the pixel location—see example Table below. Therefore, the sub-pixel accuracy of $\Delta x$ and $\Delta y$ is not lost (as per the first example).

| Pixel | x-coord. | y-coord. | Grey level | $\Delta x$ | $\Delta y$ | New x coord. | New y coord. |
|---|---|---|---|---|---|---|---|
| P1 | 1 | 1 | 50 | 0.512 | 0.123 | 1.512 | 1.123 |
| P2 | 2 | 1 | 60 | −0.534 | −0.555 | 1.466 | 0.445 |
| ... | ... | ... | ... | ... | ... | ... | ... |
| P16 | 16 | 16 | 100 | .620 | −0.101 | 16.620 | 15.899 |

The distorted image for hologram calculation is determined from the array of new coordinate values. For example, the pixel values of the distorted image may be determined by averaging the grey levels within a window around the pixel locations. Each pixel value of the distorted image may be derived from a plurality of pixel values of the target image. This process is illustrated by way of example in FIGS. 8A to 8C.

Figure 8A:
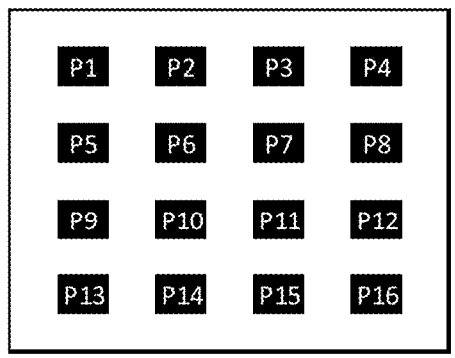
FIG. 8A shows the pixels of a target image.
Figure 8B:
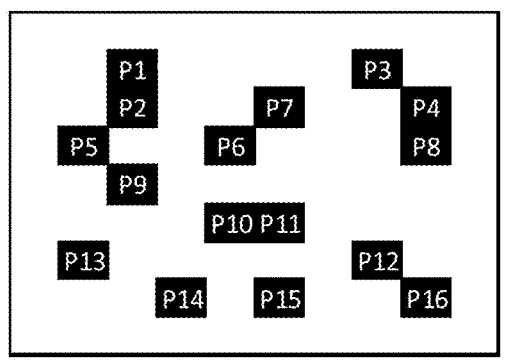
FIG. 8B shows the position of the pixels of the target image after modification using the surface.
Figure 8C:
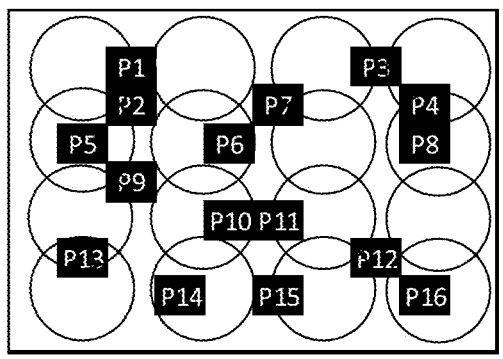
FIG. 8C shows a method of sampling the displaced pixels to form the distorted image.

FIG. 8A shows a target image comprises a regular array of sixteen pixels, P1 to P16. In accordance with this disclosure, pixels P1 to P16 are assigned a new x-coordinate value and y-coordinate value—as represented by the new pixel positions in FIG. 8B. FIG. 8C shows how pixel values of the distorted image are determined by effectively sampling the displaced pixels at least partially falling within sampling windows defining pixel positions. For example, the grey levels of pixels at least partially falling within each sampling window may be averaged to determine a new/averaged grey level corresponding to the sampling window. A pixel value of the target image may therefore be used as part of the calculation of more than one pixel of the distorted image. In some embodiments, a weighted averaging approach is used in respect of each sampling window, wherein the values of the pixels falling within the sampling window are weighted in accordance with their respective distance from the centre of the sampling window. The sampling windows may overlap. The number of sampling windows is equal to the number of pixels of the distorted image.

Figure 8D:
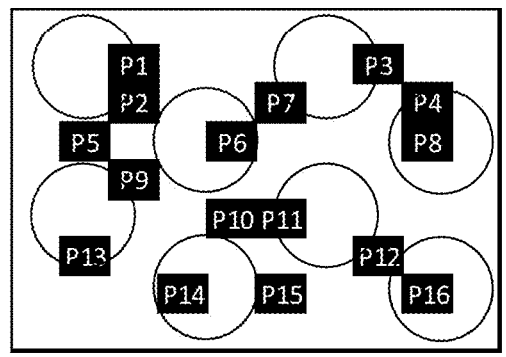
FIGS. 8D and 8E illustrate a technique of interlacing.
Figure 8E:
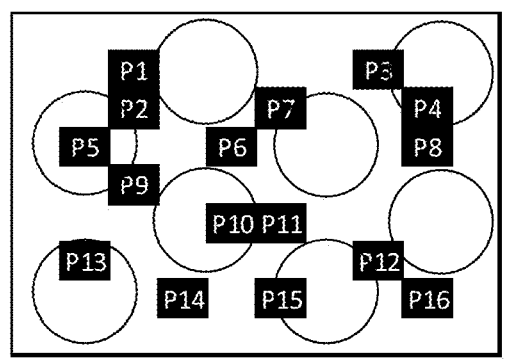

In some embodiments, the number of pixels of the distorted image (and therefore the number of sampling windows) is less than the number of pixels of the target image. In some embodiments, a first distorted image is formed using first sampling windows arranged in a first checkerboard pattern and a second distorted image is formed using second sampling windows arranged in a second checkerboard pattern. The first checkerboard pattern may be opposite to the second checkerboard pattern. FIG. 8D shows a first array of sampling windows arranged in a first checkerboard pattern. FIG. 8E shows a second array of sampling windows arranged in a second checkerboard pattern. A first hologram calculated from the first distorted image and second hologram calculated from the second distorted image may reconstructed in sequence within the integration time of the human eye to provide image interlacing that is found to improve image quality owing to a reduction in image pixel crosstalk.

The person skilled in the art of head-up display (see more below) will be familiar with the concept of a warping map to compensate for the complex curvature of the vehicle windscreen. In some further embodiments, the new coordinates of each pixel are further modified in order to include corrections defined by the warping map. In some embodiments, the warping map provides an addition Δx' and Δy' for each pixel of the target image. The warping map therefore provides an additional translational correction for each pixel in the x- and y-direction. In some embodiments, the green image is modified in accordance with the warping map before the alignment method described herein is performed. In these embodiments, the red and blue holographic reconstructions are aligned to the warped green image. In these embodiments, the red and blue target images do not need to be warped using the warping maps before hologram calculation.

Although the description above in relation to FIGS. 8A to 8E mentions warping an image by displacing pixels, it will be appreciated that the same principles may be applied to displacing image regions, each of which may be greater in size than an individual image pixel, in accordance with one or more corresponding fitted surfaces.

Although the description above discusses warping an image before hologram calculation, to provide alignment of first and second holographic reconstructions, the present disclosure is not limited to such warping. According to alternative embodiments, respective holograms of an unwarped (or undistorted) input image may be formed for each colour and a suitable grating function (or functions) may be added to one (or more) of those holograms, for illumination, in order to align the first and second holographic reconstructions. The gradient(s) of the grating function(s) that is/are used in such embodiments may be selected based on the grating function(s) that was/were previously determined as being appropriate for providing alignment, across the replay field, in relation to another image such as a calibration image.

Head-Up Display

In some embodiments, the holographic projection system is a head-up display or part of a head-up display the method of alignment disclosed is carried out in-situ in a vehicle housing the head-up display. More specifically, the image capture device may be positioned within the eye-motion-box of the head-up display. A blue and red displacement map may be determined for a plurality of different eye positions within the eye-motion-box.

Figure 9:
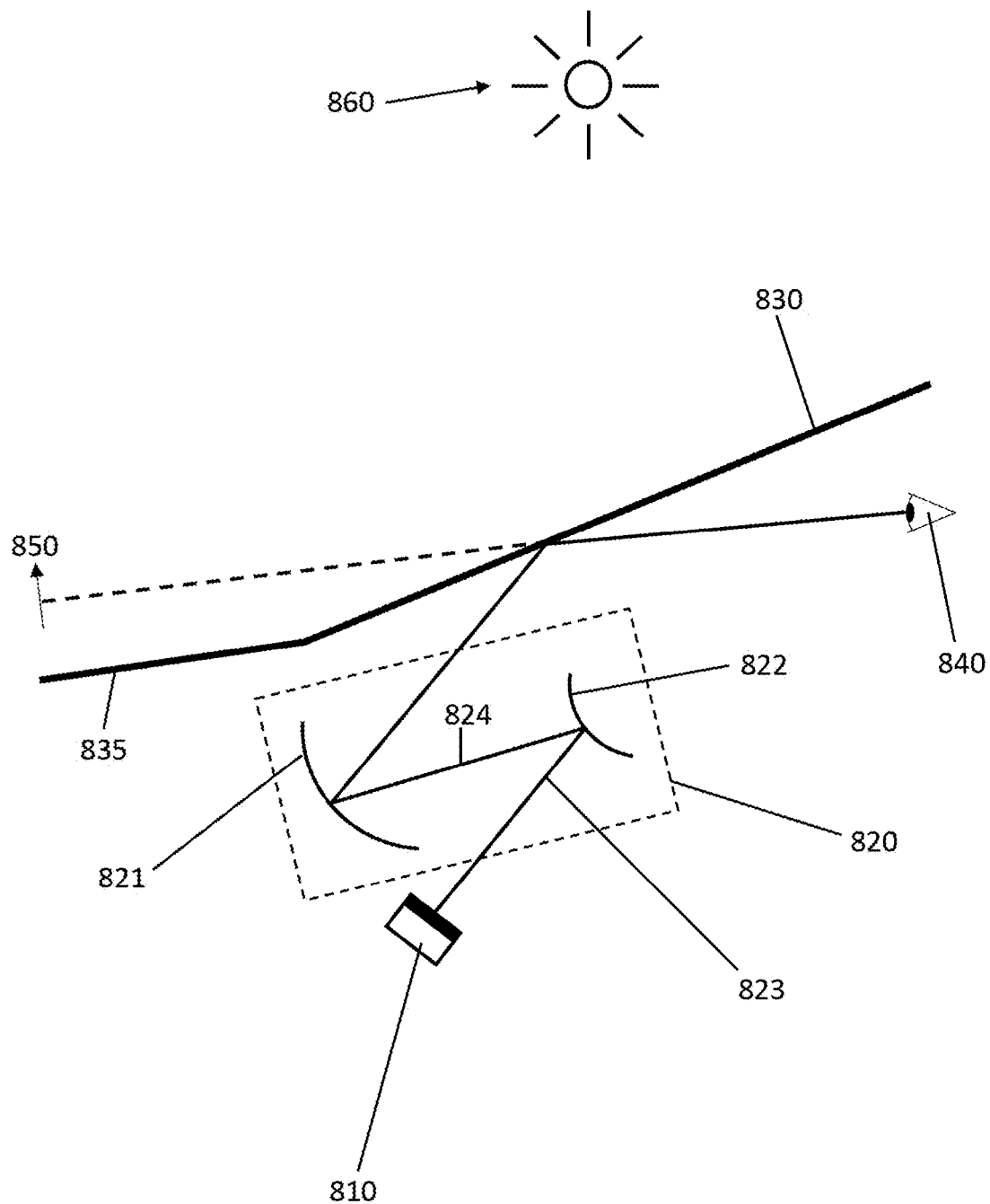
FIG. 9 shows a head-up display forming a virtual replay plane suitable for performing the methods disclosed herein.

FIG. 9 shows a HUD in a vehicle such as a car. The windscreen 830 and bonnet (or hood) 835 of the vehicle are shown in FIG. 9. The HUD comprises a picture generating unit, "PGU", 810 and an optical system 820.

The PGU 810 comprises a light source, a light receiving surface and a processor (or computer) arranged to computer-control the image content of the picture. The PGU 810 is arranged to generate a picture, or sequence of pictures, on the light receiving surface. The light receiving surface may be a screen or diffuser. In some embodiments, the light receiving surface is plastic (that is, made of plastic). The light receiving surface is disposed on the primary replay plane. That is, the holographic replay plane on which the images are first formed. Image spots may be aligned on the primary image plane. However, in some embodiments, the alignment methods disclosed herein are conducted by observing a second replay plane.

The optical system 820 comprises an input port, an output port, a first mirror 821 and a second mirror 822. The first mirror 821 and second mirror 822 are arranged to guide light from the input port of the optical system to the output port of the optical system. More specifically, the second mirror 822 is arranged to receive light of the picture from the PGU 810 and the first mirror 821 is arranged to receive light of the picture from the second mirror 822. The first mirror 821 is further arranged to reflect the received light of the picture to the output port. The optical path from the input port to the output port therefore comprises a first optical path 823 (or first optical path component) from the input to the second mirror 822 and a second optical path 824 (or second optical path component) from the second mirror 822 to the first mirror 821. There is, of course, a third optical path (or optical path component) from the first mirror to the output port but that is not assigned a reference numeral in FIG. 9. The optical configuration shown in FIG. 9 may be referred to as a "z-fold" configuration owing to the shape of the optical path.

The HUD is configured and positioned within the vehicle such that light of the picture from the output port of the optical system 820 is incident upon the windscreen 830 and at least partially reflected by the windscreen 830 to the user 840 of the HUD. Accordingly, in some embodiments, the optical system is arranged to form the virtual image of each picture in the windscreen by reflecting spatially-modulated light off the windscreen. The user 840 of the HUD (for example, the driver of the car) sees a virtual image 850 of the picture in the windscreen 830. Accordingly, in embodiments, the optical system is arranged to form a virtual image of each picture on a windscreen of the vehicle. The virtual image 850 is formed a distance down the bonnet 835 of the car. For example, the virtual image may be 1 to 2.5 metres from the user 840. The output port of the optical system 820 is aligned with an aperture in the dashboard of the car such that light of the picture is directed by the optical system 820 and windscreen 830 to the user 840. In this configuration, the windscreen 830 functions as an optical combiner. In some embodiments, the optical system is arranged to form a virtual image of each picture on an additional optical combiner which is included in the system. The windscreen 830, or additional optical combiner if included, combines light from the real world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incident upon the windscreen at Brewster's angle (also known as the polarising angle) or within 5 degrees of Brewster's angle such as within 2 degrees of Brewster's angle.

In some embodiments, the first mirror and second mirror are arranged to fold the optical path from the input to the output in order to increase the optical path length without overly increasing the physical size of the HUD.

The picture formed on the light receiving surface of the PGU 810 may only be a few centimetres in width and height. The light receiving surface of the PGU 810 may be the display plane of the alignment method. The first mirror 821 and second mirror 822, collectively or individually, provide magnification. That is, the first mirror and/or second mirror may have optical power (that is, dioptric or focusing power). The user 840 therefore sees a magnified virtual image 850 of the picture formed by the PGU. The first mirror 821 and second mirror 822 may also correct for optical distortions such as those caused by the windscreen 830 which typically has a complex curved shape. The folded optical path and optical power in the mirrors together allow for suitable magnification of the virtual image of the picture.

The PGU 810 of the present disclosure comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface.

The plane on which the virtual image may also be a display plane in accordance with the alignment method. That is, the display plane described throughout this disclosure may be the virtual image plane of a head-up display which forms virtual images using the windscreen of a vehicle or even a dashboard pop-up combiner. The display plane may also be the light receiving surface of the PGU shown in FIG. 9.

Figure 10:
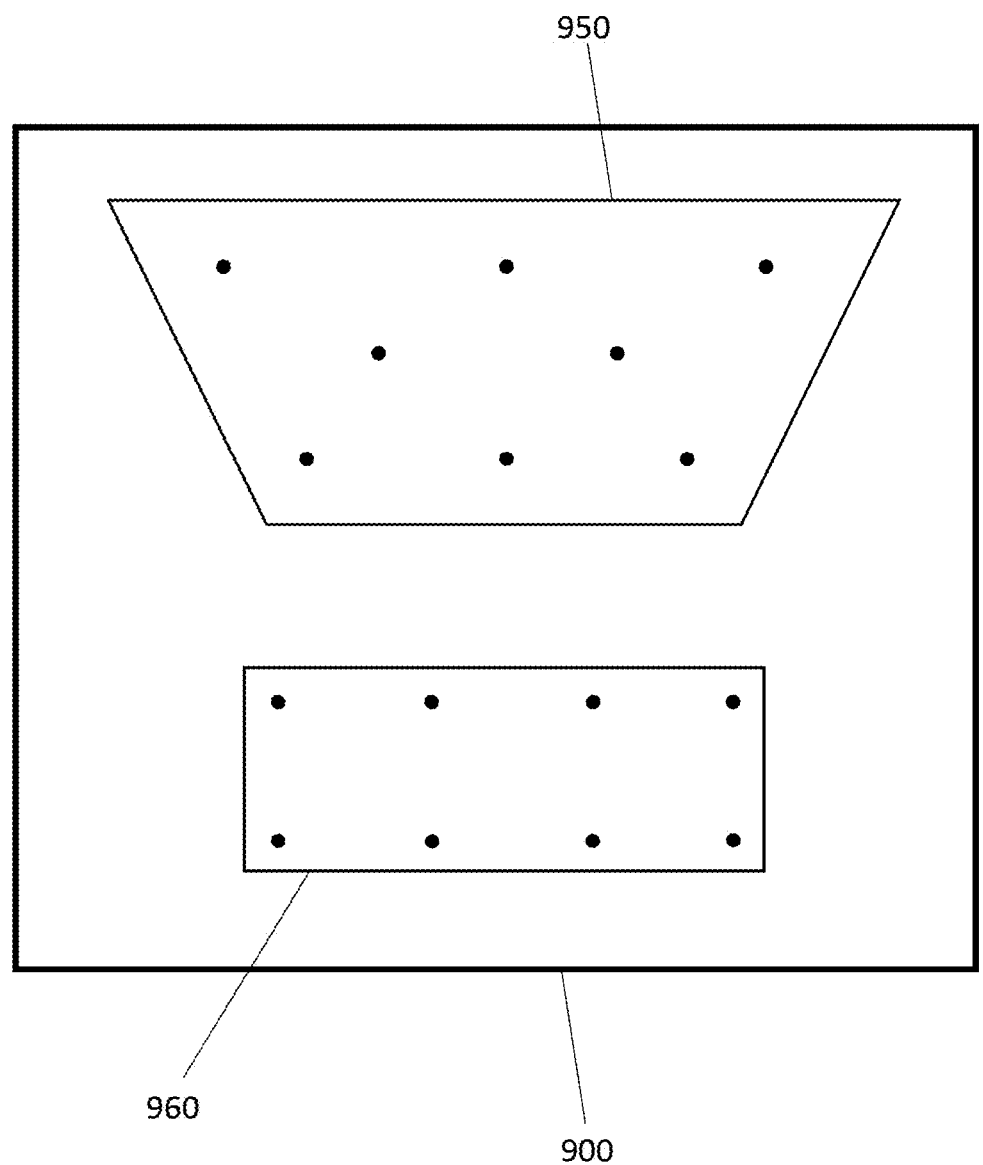
FIG. 10 shows an example replay plane in accordance with some head-up display examples.

Embodiments describe a calibration image comprising sixteen light spots by way of example only. In some embodiments, the array of light spots is regular. In other embodiments, the plurality of light spots is arranged within one or two sub-areas of the holographic replay field. The calibration image may not comprise spots per se but may comprise larger light features, for example in circular, elliptical or oval shapes. FIG. 10 shows an embodiment in which a first plurality of light spots is arranged in a first sub-area 950 of the replay field 900 and a second plurality of light spots are arranged in a second sub-area 960 of the replay field 900. The first and/or second sub-area may be non-rectangular. In FIG. 10, the first sub-area 950 has a trapezoid shape and the second sub-area 960 has a rectangular shape. The picture content of the first sub-area 950 may be relayed to a first virtual plane of a head-up display and picture content of the second sub-area 960 may be relayed to a second virtual plane of the head-up display. The first virtual plane may be a far field plane (e.g. 5-25 metres in front of the vehicle) and the trapezoid shape of the first sub-area 950 may correspond with a perspective view (that is, a driver's view) of a highway.

Embodiments described above refer to aligning light spots of a second colour (e.g. blue) with light spots of a first colour (e.g. green). In some embodiments, the method may further comprise repositioning the light spots of the first colour using the grating method before aligning the light spots of the second colour with those of the first colour. A first pair (x and y) of displacement maps may be determined for the first colour using the x- and y-grating method described herein. In this case, the first light spots are repositioned to selected points of interest in the replay field. In some embodiments, the first light spots are repositioned in order to evenly distribute the first light spots within the replay field or evenly distribute the light spots within the first and second sub-area. In some embodiments, the first light spots are repositioned in order to evenly distribute the first light spots within a display/active area of the first virtual image plane and a display/active area of the second virtual image plane. In some embodiments, a screen is positioned on the virtual plane during alignment and the light spots of the first colour and second colour are aligned to specific points of the screen by observation from the eye-motion-box. Alternatively, the second pair (x and y) of displacement maps for the second colour may be determined based on repositioned first light spots.

System Diagram

Figure 11:
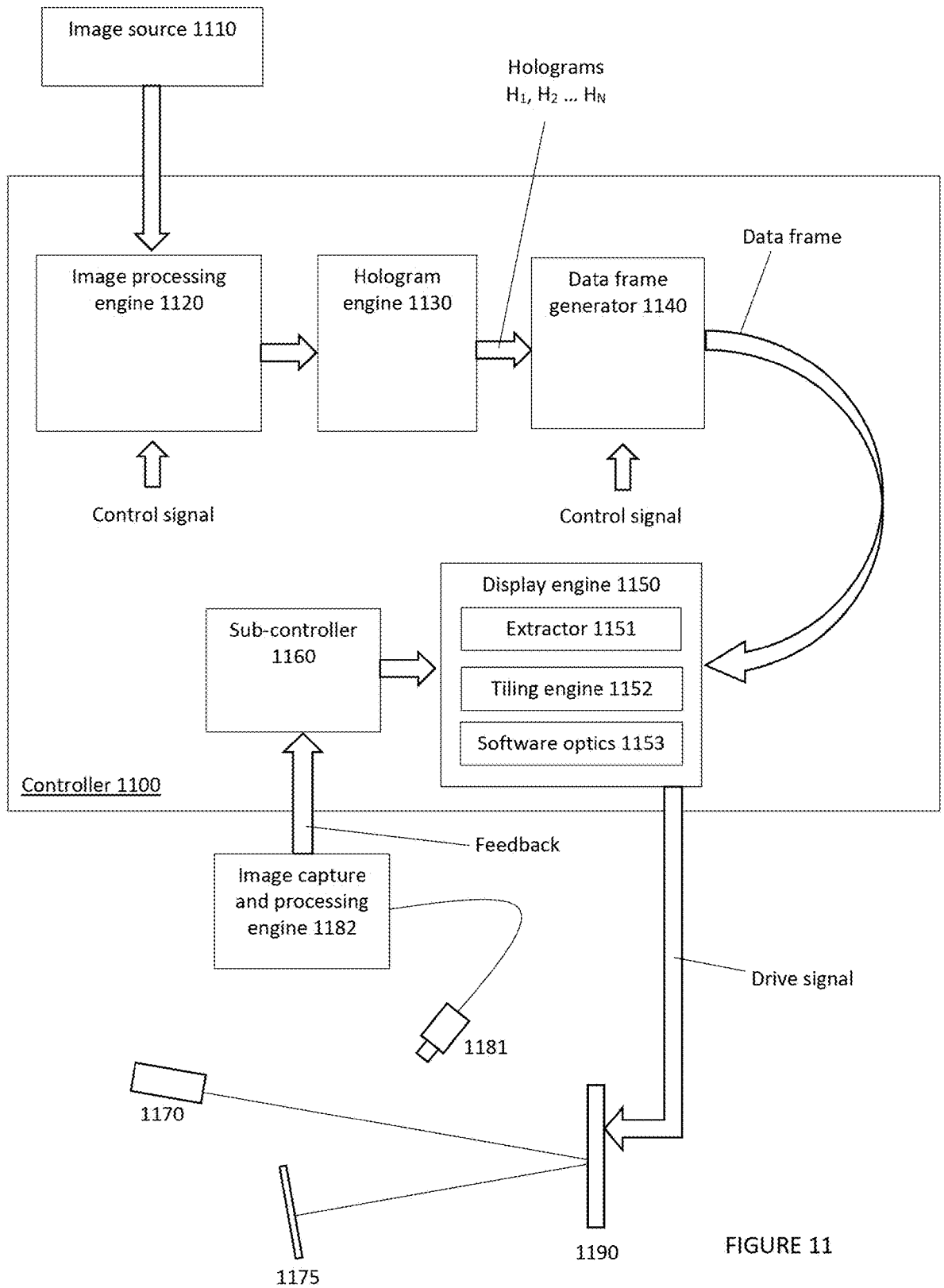
FIG. 11 is a schematic showing one single colour channel of a holographic projection system in accordance with embodiments.

FIG. 11 is a schematic showing one single colour channel of a holographic system in accordance with embodiments. A spatial light modulator (SLM) 1190 is arranged to display holograms received from a controller 1100. In operation, a light source 1170 illuminates the hologram displayed on SLM 1190 and a holographic reconstruction is formed in a replay field on a replay plane 1175. The replay plane 1175 may be the display plane of the alignment method. In embodiments, an image processing engine 1120 receives images from an image source 1110. In some embodiments, image source 1110 may be provide image processing engine 1120 with calibration images each comprising at least one light feature, as described herein.

Controller 1100 comprises image processing engine 1120, hologram engine 1130, data frame generator 1140 and display engine 1150. Image processing engine 1120 receives a at least one source image from image source 1110. Image processing engine 1120 may provide optional processing of the image prior to hologram calculation. In accordance with this disclosure, no processing of the image is essential and the image processing engine 950 may pass the received images directly to the hologram engine 1130 for calculating the corresponding hologram(s). Alternatively, the image processing engine 1120 may warp one or more single colour image in accordance with a warping map characterising, for example, an optical system (e.g. optical system 820 of FIG. 9) of a head-up display.

Hologram engine 1130 is arranged to determine a hologram corresponding to each image received from image processing engine 1120. For example, the hologram engine 1130 may implement the hologram calculation method described above. Hologram engine 1130 passes the hologram to data frame generator 1140. Data frame generator 1140 is arranged to generate a data frame (e.g. HDMI frame) comprising the hologram. Data frame generator 1140 passes the data frame to display engine 1150. Display engine 1150 is arranged to form a diffractive pattern comprising the hologram for display. Display engine 1150 comprises an extractor 1151, tiling engine 1152 and software optics 1153. Display engine 1150 extracts each hologram from the data frame using extractor 1151 and tiles the hologram according to a tiling scheme generated by tiling engine 1152, as described below. In particular, tiling engine 1152 may receive a control signal from sub-controller 1160 to determine the tiling scheme, or may otherwise determine a tiling scheme for tiling based on the hologram or some other control signal. Software optics includes a lensing function having a software-controlled focal length and at least one 1D grating function (such as a x-direction grating function and a y-direction grating function) having a software-controlled grating angle. In accordance with this disclosure, display engine 1150 may add at least one variable grating function to the hologram to translate the position of the replay field on the replay plane, as described herein. For example, this may occur when the system is carrying out an alignment method with respect to a calibration image, as detailed above in relation to earlier Figures. Accordingly, for each hologram, display engine 1150 is arranged to output a drive signal to SLM 1190 to display each diffractive pattern including a hologram and optionally also including a grating function, in a synchronised scheme, as described herein.

The system further comprises an image capture device 1181 (e.g. a camera) arranged to capture images of replay fields on replay plane 1175 including at least one light feature. Image capture and processing engine 1182 processes the output signal received from image capture device 1181 to determine a position of at least one light feature of the replay field in accordance with the alignment method of this disclosure. Image capture and processing engine 1182 provides feedback to the sub-controller 1160 of the display engine 1150 that may form the basis of an automated process that determines a new grating angle or change to the grating angle. As the skilled person will appreciate, the above-described features of controller 1100 may be implemented in software, firmware or hardware, and any combination thereof.

In embodiments, display engine 1150 is arranged to receive the red component, green component, and blue component of an image for display on the display plane 1175. Each single colour component of the image for display is processed by the pipeline shown in FIG. 11 to generate a drive signal for each single colour. Display engine 1150 therefore provides a drive signal to additional SLMs not shown in FIG. 11. Each additional SLM is illuminated by an additional light source to form an additional holographic reconstruction on replay plane 1175.

Additional Features

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality.

Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the image capture device is a camera such as a CCD camera. In some embodiments, holographic reconstructions are formed on a light receiving surface. The light receiving surface may be a diffuse surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of aligning a first holographic reconstruction and a second holographic reconstruction, the method comprising:
forming a first holographic reconstruction of a first plurality of discrete light features on a display plane using a first holographic projection channel, wherein the first holographic projection channel comprises a first spatial light modulator arranged to display holograms, the first spatial light modulator being arranged for illumination by light of a first wavelength;
forming a second holographic reconstruction of a second plurality of discrete light features on the display plane using a second holographic projection channel, wherein the second holographic projection channel comprises a second spatial light modulator arranged to display the holograms combined with at least one grating function, wherein each grating function has a respective displacement direction, the second spatial light modulator being arranged for illumination by light of a second wavelength;
capturing images of the display plane;
for each discrete light feature of the first plurality of discrete light features, individually determining a grating angle of each grating function required to align, in the respective displacement direction, the first holographic reconstruction of the respective discrete light feature of the first plurality of discrete light features with the second holographic reconstruction of the corresponding discrete light feature of the second plurality of discrete light features in order to obtain, for each displacement direction, a plurality of grating angles at a respective plurality of different locations on the display plane.

2. The method as claimed in claim 1 wherein individually determining the grating angle of each grating function required to align comprises changing the grating angle until a captured image of the display plane shows that the first holographic reconstruction of the discrete light feature is aligned, in the displacement direction of the grating function, with the second holographic reconstruction of the discrete light feature.

3. The method as claimed in claim 1 further comprising calculating a distance corresponding to each determined grating angle to form a displacement value in each displacement direction at each location of the plurality of different locations on the display plane.

4. The method as claimed in claim 1 further comprising forming by interpolation a displacement map for the replay field area of the second holographic projection channel in each displacement direction.

5. The method as claimed in claim 4 further comprising: processing a target image for holographic reconstruction by the second holographic projection channel in accordance with each displacement map to form a modified target image; calculating a hologram of the modified target image; displaying the hologram of the modified target image on the second spatial light modulator; and illuminating the second spatial light modulator in order to form a second holographic reconstruction of the target image.

6. The method as claimed in claim 5 wherein processing the target image comprises displacing image pixels of the target image in accordance with each displacement map.

7. The method as claimed in claim 5, further comprising calculating a distance corresponding to each determined grating angle to form a displacement value in each displacement direction at each location of the plurality of different locations on the display plane, wherein processing the target image comprises determining a displaced position for each pixel of the target image and sampling pixel values within sampling windows around pixel locations of the modified target image.

8. The method as claimed in claim 7 further comprising forming a second modified target image by sampling pixel values with second sampling windows around pixel locations of the modified target image.

9. The method as claimed in claim 5 further comprising: calculating a hologram of the target image; displaying the hologram of the target image on the first spatial light modulator; and illuminating the first spatial light modulator in order to form a first holographic reconstruction of the target image.

10. The method as claimed in claim 1 wherein the first holographic reconstruction and second holographic reconstruction are formed on a screen disposed on the display plane.

11. The method as claimed in claim 10 further comprising forming a displacement map for the replay field area of the first holographic projection channel in each displacement direction and processing a target image for projection by the first holographic projection channel before hologram calculation in order to compensate for any image distortion caused by the optical combiner.

12. The method as claimed in claim 1 further comprising forming a virtual image of the first holographic reconstruction and second holographic reconstruction on the display plane using an optical combiner.

13. The method as claimed in claim 12, wherein the optical combiner is a windscreen of a vehicle.

14. The method as claimed in claim 1 wherein the plurality of discrete light features of each holographic projection channel is formed using only one hologram or a plurality of different holograms displayed in succession.

15. The method as claimed in claim 1 wherein the at least one grating function comprises a first grating function in a first displacement direction and a second grating function in a second displacement direction, wherein the first displacement direction is perpendicular to the second displacement direction.

16. The method as claimed in claim 1 wherein each light feature is an image pixel of the holographic reconstruction wherein an image pixel is the smallest feature that can be holographically reconstructed by the holographic projection channel.

17. The method as claimed in claim 1 wherein each discrete light feature comprises an area, within the holographic reconstruction, that is larger than an image pixel, wherein an image pixel is the smallest feature that can be holographically reconstructed by the holographic projection channel.

18. A display system comprising:
a first holographic projection channel comprising a first spatial light modulator arranged to display holograms and a light source arranged for illumination of the first spatial light modulator by light of a first wavelength;
a second holographic projection channel comprising a second spatial light modulator arranged to display holograms combined with at least one grating function, wherein each grating function has a respective displacement direction, and a light source arranged for illumination of the second spatial light modulator by light of a second wavelength;

an image capture device; and a processor;

the display system being configured to align a first holographic reconstruction and a second holographic reconstruction by:

forming a first holographic reconstruction of a first plurality of discrete light features on a display plane using the first holographic projection channel;

forming a second holographic reconstruction of a second plurality of discrete light features on the display plane using the second holographic projection channel;

capturing images of the display plane; and for each discrete light feature of the first plurality of discrete light features, individually determining a grating angle of each grating function required to align, in the respective displacement direction, the respective first holographic reconstruction of the discrete light feature of the first plurality of discrete light features with the second holographic reconstruction of the corresponding discrete light feature of the second plurality of discrete light features in order to obtain, for each displacement direction, a plurality of grating angles at a respective plurality of different locations on the display plane.

19. A method of displaying a first holographic reconstruction and a second holographic reconstruction, the method comprising:

receiving an image for projection, wherein the image comprises a first colour component and a second colour component;

obtaining a displacement map, comprising a plurality of displacement values, the displacement map being a map of displacement of the second holographic reconstruction with respect to the first holographic reconstruction on a replay plane;

pre-processing the second colour component of the image in accordance with the displacement map to distort the second colour component of the image, and then calculating a hologram of the first colour component and a hologram of the distorted second colour component;

forming the first holographic reconstruction on the replay plane by displaying the hologram of the first colour component on the first spatial light modulator and illuminating with light of the first colour; and forming the second holographic reconstruction on the replay plane by displaying the hologram of the pre-processed second colour component on the second spatial light modulator and illuminating with light of the second colour.

20. The method of claim 19 further comprising pre-processing the first colour component in accordance with an error map, before the step of calculating a hologram of the first colour component.

* * * * *